(12) United States Patent
Hanagan et al.

(10) Patent No.: US 12,252,203 B1
(45) Date of Patent: Mar. 18, 2025

(54) METHOD AND APPARATUS FOR HEATING AND COOLING A MOTORCYCLE SEAT

(71) Applicants: Michael Hanagan, Hollister, CA (US); Rick Walterson, Park City, UT (US)

(72) Inventors: Michael Hanagan, Hollister, CA (US); Rick Walterson, Park City, UT (US)

( * ) Notice: Subject to any disclaimer, the term of this patent is extended or adjusted under 35 U.S.C. 154(b) by 383 days.

(21) Appl. No.: 17/361,012

(22) Filed: Jun. 28, 2021

Related U.S. Application Data

(60) Continuation of application No. 16/990,718, filed on Aug. 11, 2020, now Pat. No. 11,077,906, which is a division of application No. 15/913,886, filed on Mar. 6, 2018, now Pat. No. 10,793,218.

(60) Provisional application No. 62/467,612, filed on Mar. 6, 2017.

(51) Int. Cl.
*B62J 33/00* (2006.01)
*B62J 1/00* (2006.01)
*B62J 1/12* (2006.01)
*B62J 45/00* (2020.01)
*B62J 99/00* (2020.01)

(52) U.S. Cl.
CPC ............. *B62J 33/00* (2013.01); *B62J 1/007* (2013.01); *B62J 1/12* (2013.01); *B62J 99/00* (2013.01); *B60Y 2306/05* (2013.01); *B62J 45/00* (2020.02)

(58) Field of Classification Search
CPC ..... B62J 33/00; B62J 1/007; B62J 1/12; B62J 45/00; B62J 99/00; B60N 2/56; B60Y 2306/05
USPC .................................................. 297/456.46
See application file for complete search history.

(56) References Cited

U.S. PATENT DOCUMENTS

| | | | |
|---|---|---|---|
| 7,178,866 B1 | 2/2007 | Scott | |
| 8,556,337 B1 * | 10/2013 | Cornitius-Cary | A47C 7/746 297/188.2 |
| 2004/0183343 A1 | 9/2004 | Probst | |
| 2005/0161193 A1 | 7/2005 | McKenzie | |
| 2006/0279113 A1 | 12/2006 | Pautz | |
| 2008/0016981 A1 * | 1/2008 | Flynn | B62J 33/00 74/551.8 |
| 2010/0038067 A1 | 2/2010 | Flynn | |
| 2017/0144571 A1 * | 5/2017 | Chiba | B62J 45/412 |
| 2017/0274951 A1 | 9/2017 | Xicola Serrano | |
| 2018/0304949 A1 * | 10/2018 | Ingram | B60N 2/5685 |
| 2019/0061574 A1 | 2/2019 | Schwintek | |

FOREIGN PATENT DOCUMENTS

| | | | | |
|---|---|---|---|---|
| WO | WO-2012154104 A1 * | 11/2012 | | B60N 2/56 |
| WO | WO-2015100591 A1 * | 7/2015 | | B60N 2/5657 |
| WO | WO-2016025776 A1 * | 2/2016 | | B60N 2/40 |

* cited by examiner

*Primary Examiner* — Milton Nelson, Jr.
(74) *Attorney, Agent, or Firm* — Heimlich Law, PC; Alan Heimlich, Esq.

(57) ABSTRACT

A Method and Apparatus for Heating and Cooling a Motorcycle Seat have been disclosed. In one implementation a plurality of heating and cooling elements are used to affect heating and cooling a motorcycle seat.

1 Claim, 31 Drawing Sheets

METHOD AND APPARATUS FOR HEATING AND COOLING A MOTORCYCLE SEAT

RELATED APPLICATION

This patent application claims priority of pending U.S. application Ser. No. 16/990,718 filed Aug. 11, 2020 titled "Method and Apparatus for Heating and Cooling a Motorcycle Seat", which is hereby incorporated herein by reference, and which claims priority to U.S. application Ser. No. 15/913,886 filed Mar. 6, 2018, now U.S. patent Ser. No. 10/793,218 titled "Method and Apparatus for Heating and Cooling a Motorcycle Seat", which is hereby incorporated herein by reference, and which claims priority to U.S. Provisional Application Ser. No. 62/467,612 filed Mar. 6, 2017 titled "Method and Apparatus for Heating and Cooling a Motorcycle Seat", which is hereby incorporated herein by reference.

FIELD OF THE INVENTION

The present invention pertains to heating and cooling a seat. More particularly, the present invention relates to Method and Apparatus for Heating and Cooling a Motorcycle Seat.

BACKGROUND OF THE INVENTION

Heating and particularly cooling a seat can be a challenge—particularly so when the seat is subject to, among other things, external forces and a varying load both physically and thermally and the heating and cooling system must be both compact and robust.

This presents a technical problem for which a technical solution using a technical means is needed.

BRIEF DESCRIPTION OF THE DRAWINGS

The invention is illustrated by way of example and not limitation in the figures of the accompanying drawings.

DETAILED DESCRIPTION

Figure 1:
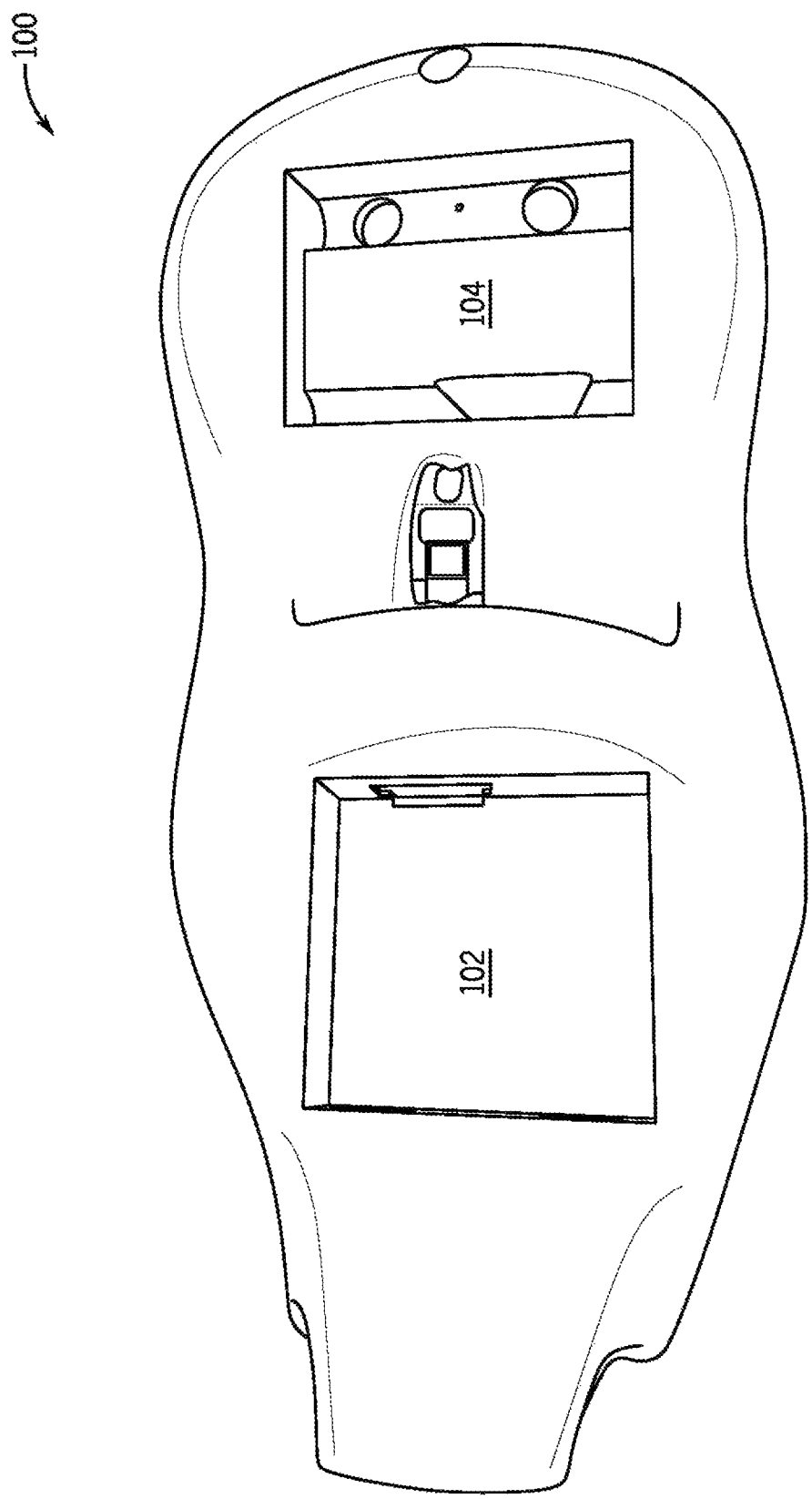
FIG. 1 illustrates one embodiment showing a Corbin raw seat shape.

While embodiments of the invention are illustrated for a motorcycle seat, the invention is not so limited and the techniques disclosed can be applied to other seats, for example, but not limited to seats for airplanes, boats, trains, busses, etc.

In one embodiment the techniques support a heating and cooling apparatus that can be sculptured to fit an individual rider sitting on the seat.

Since the heating and cooling seat can in one mode of operation provide heat and in another mode of operation provide cooling this seat may be referred to at times as fireice.

In one embodiment neither the heating mode of operation nor the cooling mode of operation is in effect but rather a third mode of operation is in effect, that of forcibly circulating ambient air.

As used in this description "Corbin" or similar terms refers to a brand of seats made by Corbin-Pacific Inc.

headquartered at 2360 Technology Parkway, Hollister, California. 95023 USA. Website: http://corbin.com/

In one embodiment the switch unit incorporates a 3 position switch—one position for off, another position for heating, and another position for cooling.

In one embodiment the switch unit incorporates a 4 position switch—one position for off, another position for heating, another position for cooling, and another position for fan(s) on (e.g. forced circulation of ambient air).

In one embodiment the switch unit or controller unit is remotely controlled, by, for example, Bluetooth or a smart phone.

In one embodiment the switch unit or controller unit is remotely controlled, by, for example, a smart phone that can set mode of operation, timing, and remote temperature readings.

For example, in one embodiment a smart phone application can sense the seat temperature and be programmed to heat or cool the seat to a desired temperature on desired days. In one embodiment the application can also alert a user about an unauthorized body on the seat by, for example, sensing an increase in temperature within a given time period (e.g. temperature rate increase).

In one embodiment of the invention a single heating/cooling element (HCE) is used in the seat.

The HCE can also be considered to be part of a thermal engine.

In one embodiment of the invention two or more heating/cooling elements (HCEs) may be used in a seat. In one embodiment the HCEs may be operated independently of each other. For example, in an embodiment with 2 HCEs Table 1 below shows the possible modes of operation.

TABLE 1

| Heating/Cooling Element #1 (HCE #1) | Heating/Cooling Element #2 (HCE #2) |
|---|---|
| OFF | OFF |
| OFF | ON-Heating or Cooling |
| ON-Heating or Cooling | OFF |
| ON-Heating or Cooling | ON-Heating or Cooling |

In one embodiment one or more HCEs may be wired in parallel or series or series-parallel, or parallel-series or any such combination and may be operated in heating mode or cooling mode or off mode independently of each other. That is, for example, in a series mode having 2 HCEs in series, HCE #1 may be in cooling mode and HCE #2 in a heating mode. Or HCE #2 may be off by simply bypassing (shorting around) HCE #2. All other combinations are also possible, taking care of course to not short out the power supply.

The HCE may be in one embodiment a thermoelectric device. Such a thermoelectric device can generate electricity, measure temperature, and heat or cool at a junction. The heating or cooling a junction is controlled by the polarity of the applied voltage. That is reversing a voltage (V) will change the direction of a direct current (DC) flowing into the junction and change the mode of operation from heating to cooling or vice versa (cooling to heating).

In one embodiment the heating and cooling element may be separate mechanisms. For example, cooling may be effected by a thermoelectric device and heating by an electrically resistive element, for example, nichrome.

In one embodiment one or more fans may be operated independently of each other or in conjunction with each other. In one embodiment the activation of a fan for on or off or speed control may be effected by conditions at a HCE.

In one embodiment one or more HCEs may be controlled by a device, such as, but not limited to a thermostat, over temperature switch, etc.

The motorcycle seat is also known as a saddle. The saddle is referred to at times as the Corbin "Fire & Ice" saddle, or fireice. The heating and cooling pad is also known as the HCE and the combination heating and cooling pad, a combination heating/cooling pad (combo pad), or similar terms.

In one embodiment one or more fans suck air from underneath a seat and force it past one or more HCEs to provide circulation.

FIG. 1 illustrates, generally at 100, one embodiment showing a Corbin raw seat shape. Note the void areas inset front 102 and back 104 to accept the combination heating and cooling pad.

Figure 2:
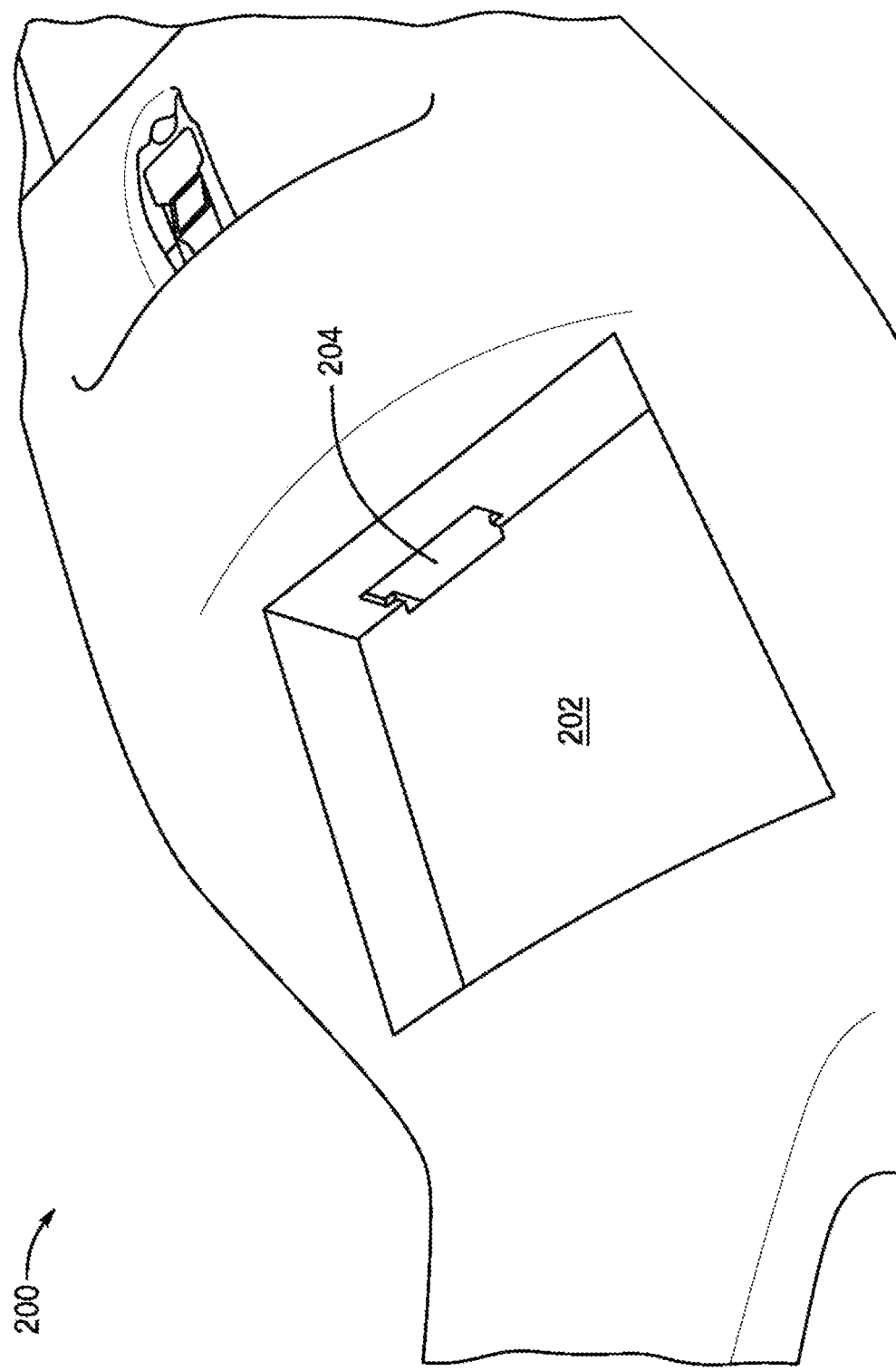
FIG. 2 illustrates one embodiment showing a closer view of front seating position.

FIG. 2 illustrates, generally at 200, one embodiment showing a closer view of front seating position 202. Note the air intake port 204 at the back area.

Figure 3:
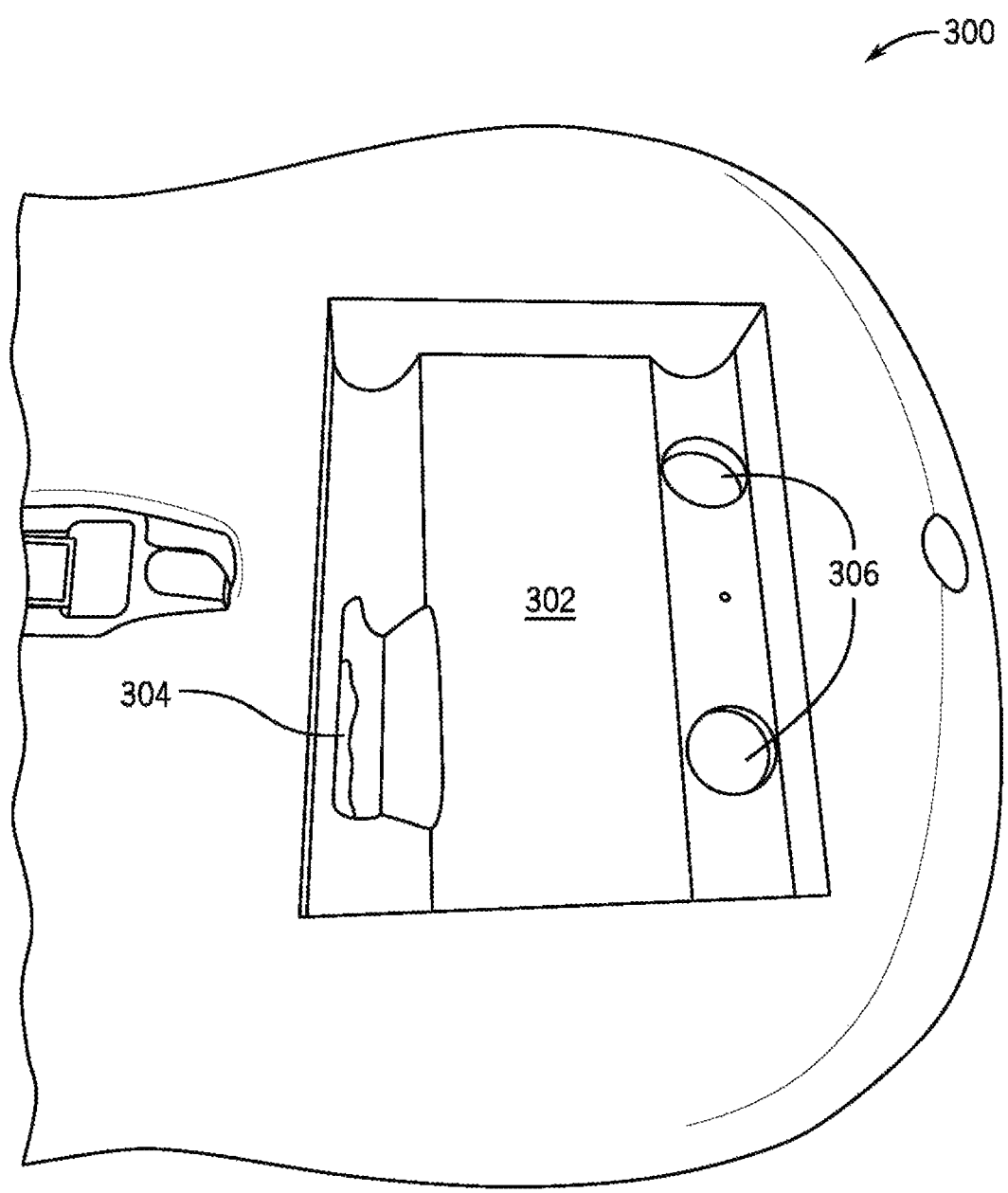
FIG. 3 illustrates one embodiment showing a closer view of the rear seating position.

FIG. 3 illustrates, generally at 300, one embodiment showing a closer view of the rear seating position 302. An air intake port is on the left at 304, and two air exhaust ports are on the right at 306.

Figure 4:
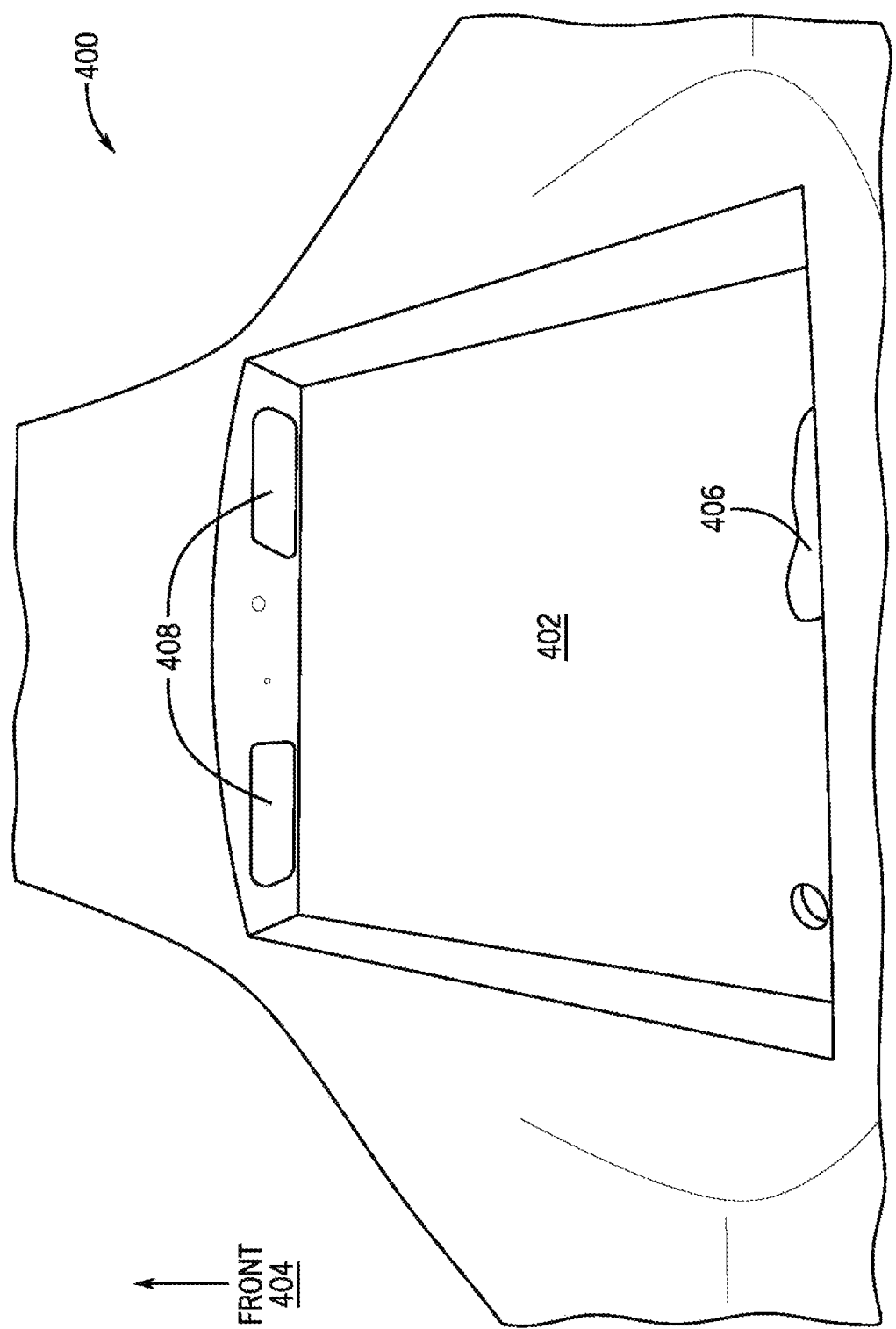
FIG. 4 illustrates one embodiment showing a view of the front seating area looking towards the front of the seat.

FIG. 4 illustrates, generally at 400, one embodiment showing a view of the front seating area 402 looking towards the front of the seat 404. An air intake port is visible at the lower right of the frame at 406. Two air exhaust ports can be seen at the top at 408.

Figure 5:
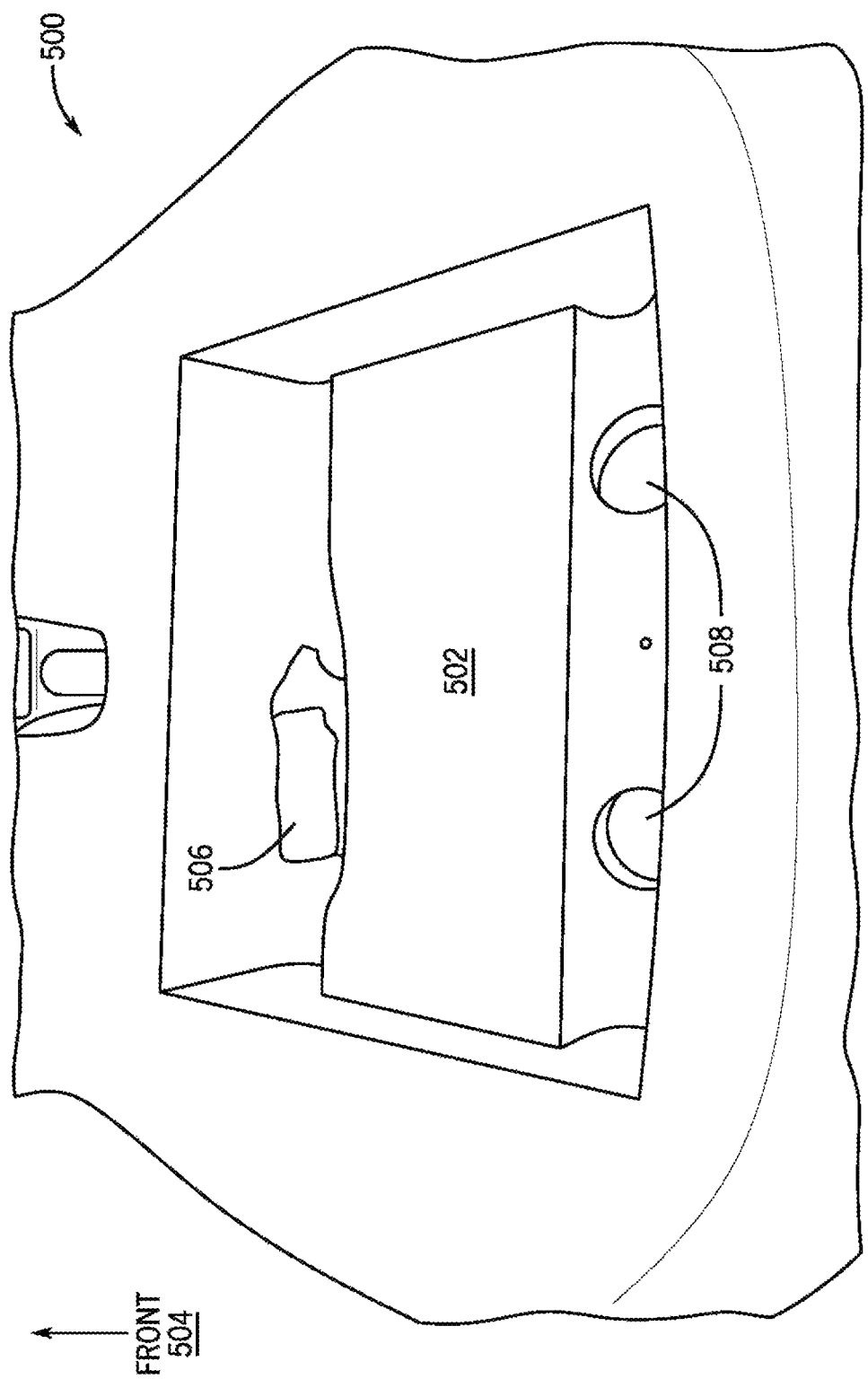
FIG. 5 illustrates one embodiment showing a view of the rear seating area looking towards the front of the seat.

FIG. 5 illustrates, generally at 500, one embodiment showing a view of the rear seating area 502 looking towards the front of the seat 504. An air intake port is at the top at 506, and two air exhaust ports 508 are at the bottom.

Figure 6:
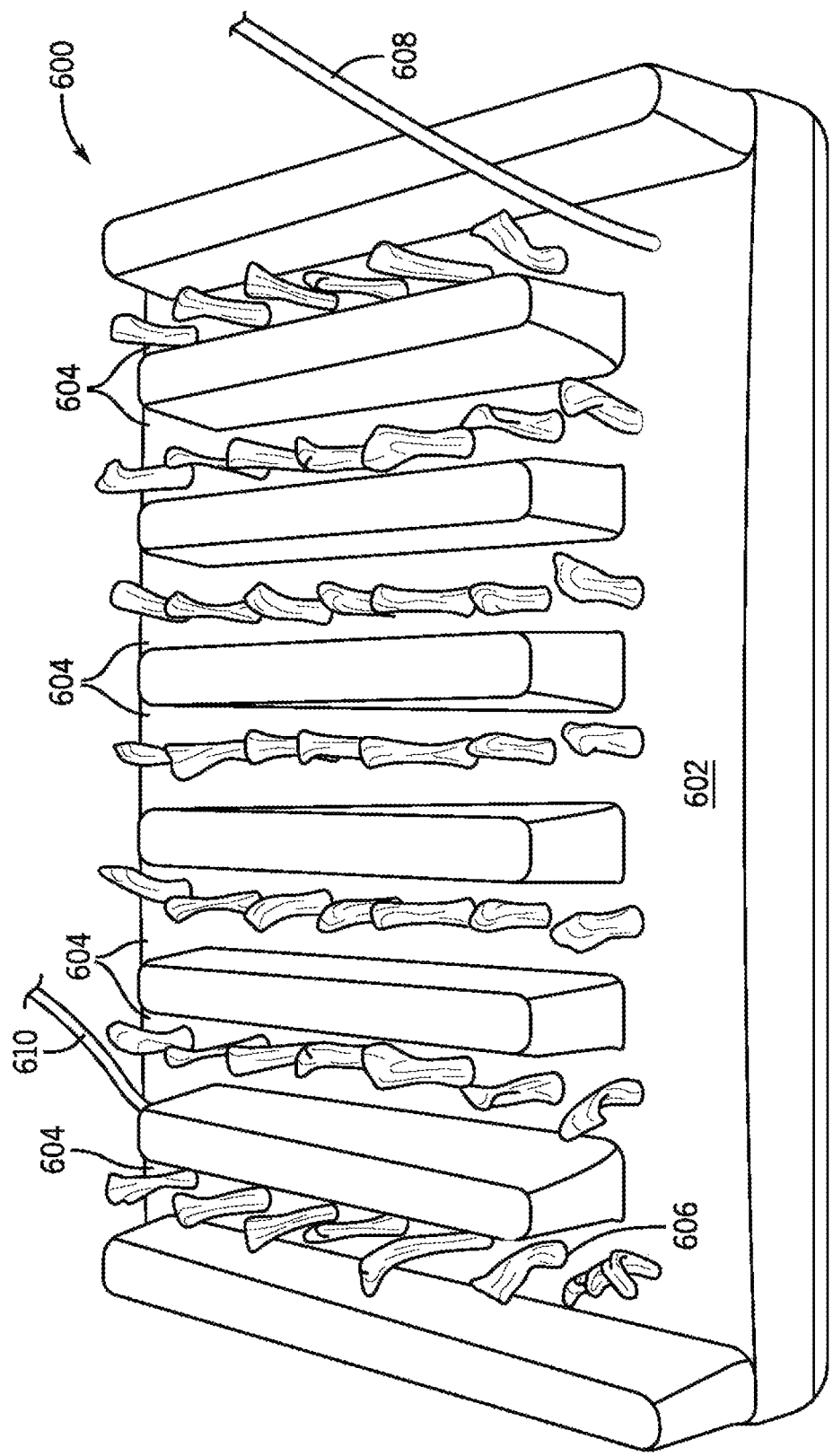
FIG. 6 illustrates one embodiment showing bottom view of a combination heating/cooling pad (combo pad) before installation.

FIG. 6 illustrates, generally at 600, one embodiment showing a combination heating/cooling pad (combo pad) 602 before installation. Shown is a bottom view. Note flexible channels 604 for forced air to travel across the pad area cooling off the conductors (example at 606). Note also the positive 608 and negative 610 electrical connections. While FIG. 6 illustrates one embodiment showing of conductors 606 which are multi-stranded, the invention is not so limited and a loop ribbon or similar structure may be used.

Figure 7:
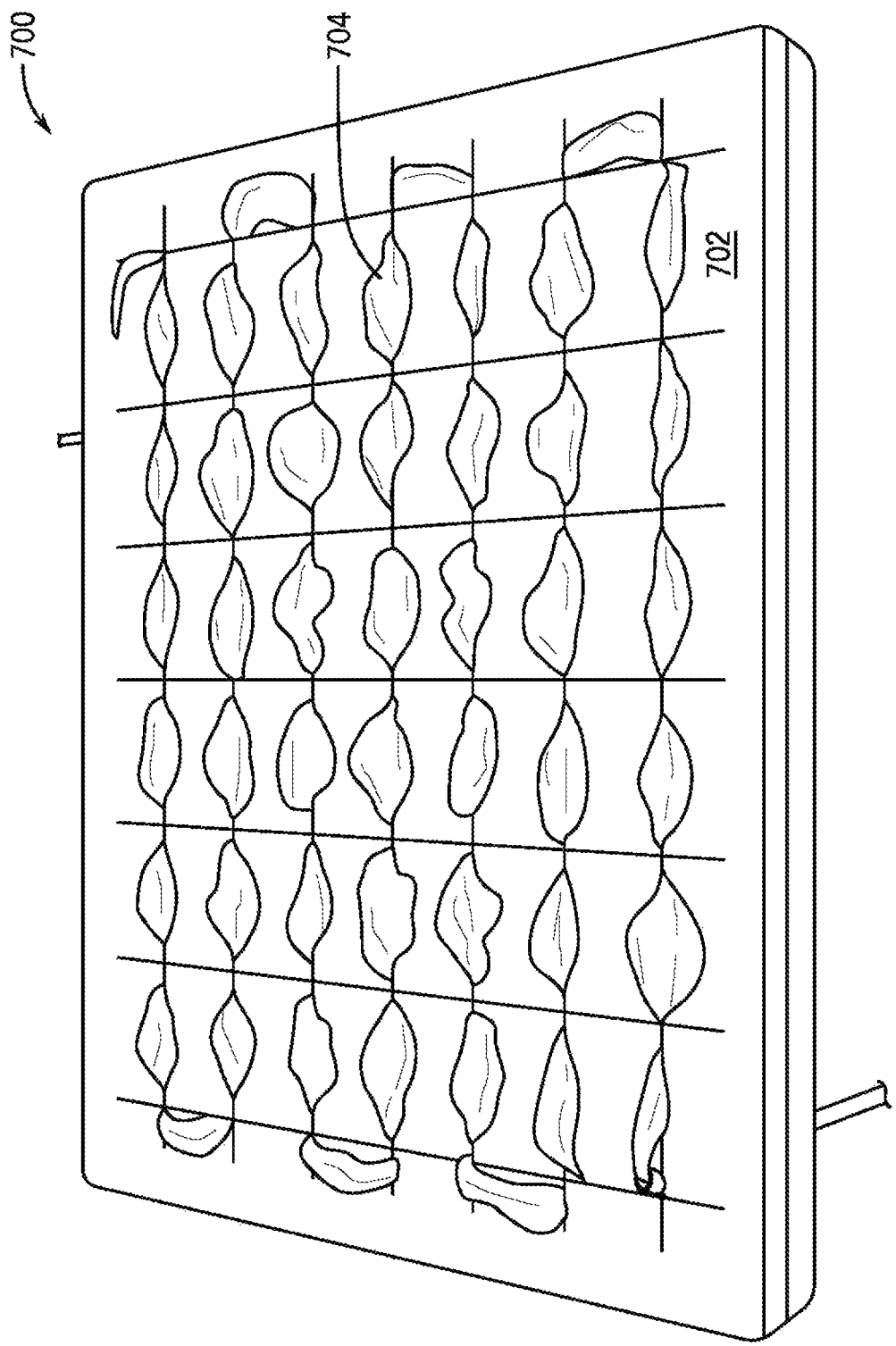
FIG. 7 illustrates one embodiment showing a top view of the combo pad before installation.

FIG. 7 illustrates, generally at 700, one embodiment showing a top view of the combo pad 702 before installation. Braided conductors (example at 704) can be seen spread out to evenly disperse the contact area. While FIG. 7 illustrates one embodiment showing of conductors 704 which are multi-stranded, the invention is not so limited and a flat flexible strip or ribbon or similar structure may be used.

Figure 8:
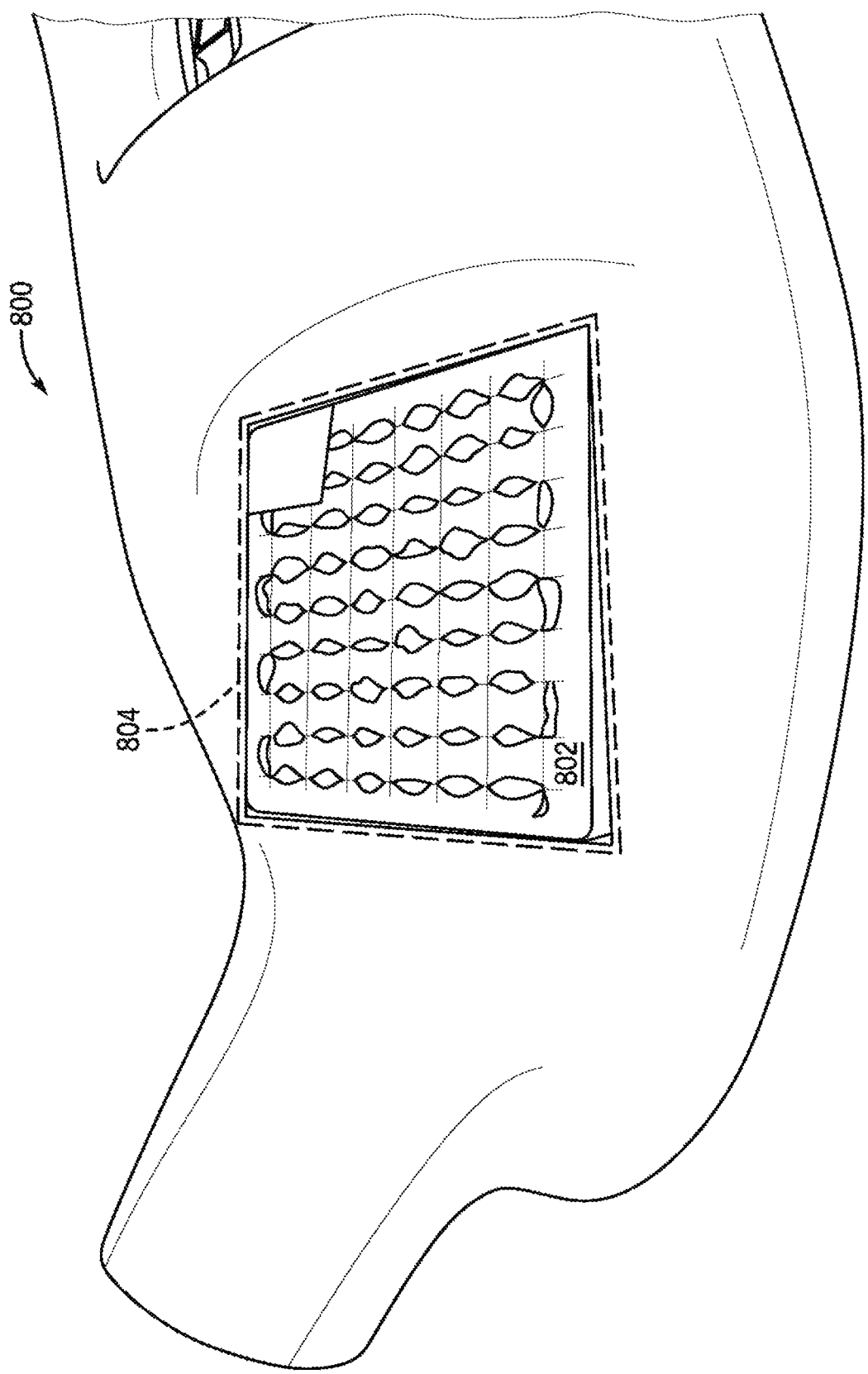
FIG. 8 illustrates one embodiment showing one embodiment of a combination heating/cooling pad installed in the front seating position.

FIG. 8 illustrates, generally at 800, one embodiment showing a combination heating/cooling pad 802 installed in the front seating position 804 (dashed line).

Figure 9:
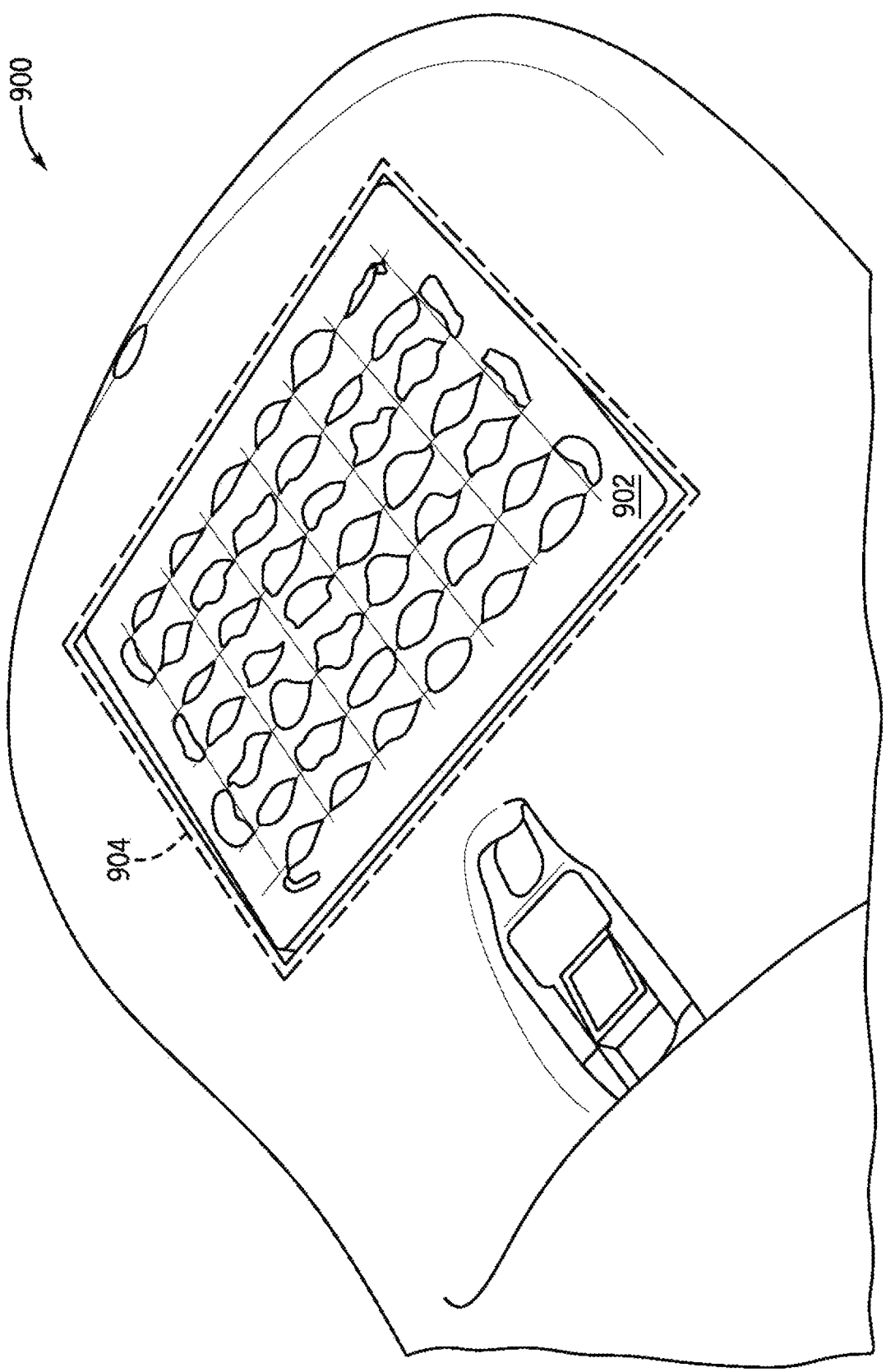
FIG. 9 illustrates one embodiment showing one embodiment of a combination heating/cooling pad installed in a rear seating position.

FIG. 9 illustrates, generally at 900, one embodiment showing a combination heating/cooling pad 902 installed in a rear seating position 904 (dashed line).

Figure 10:
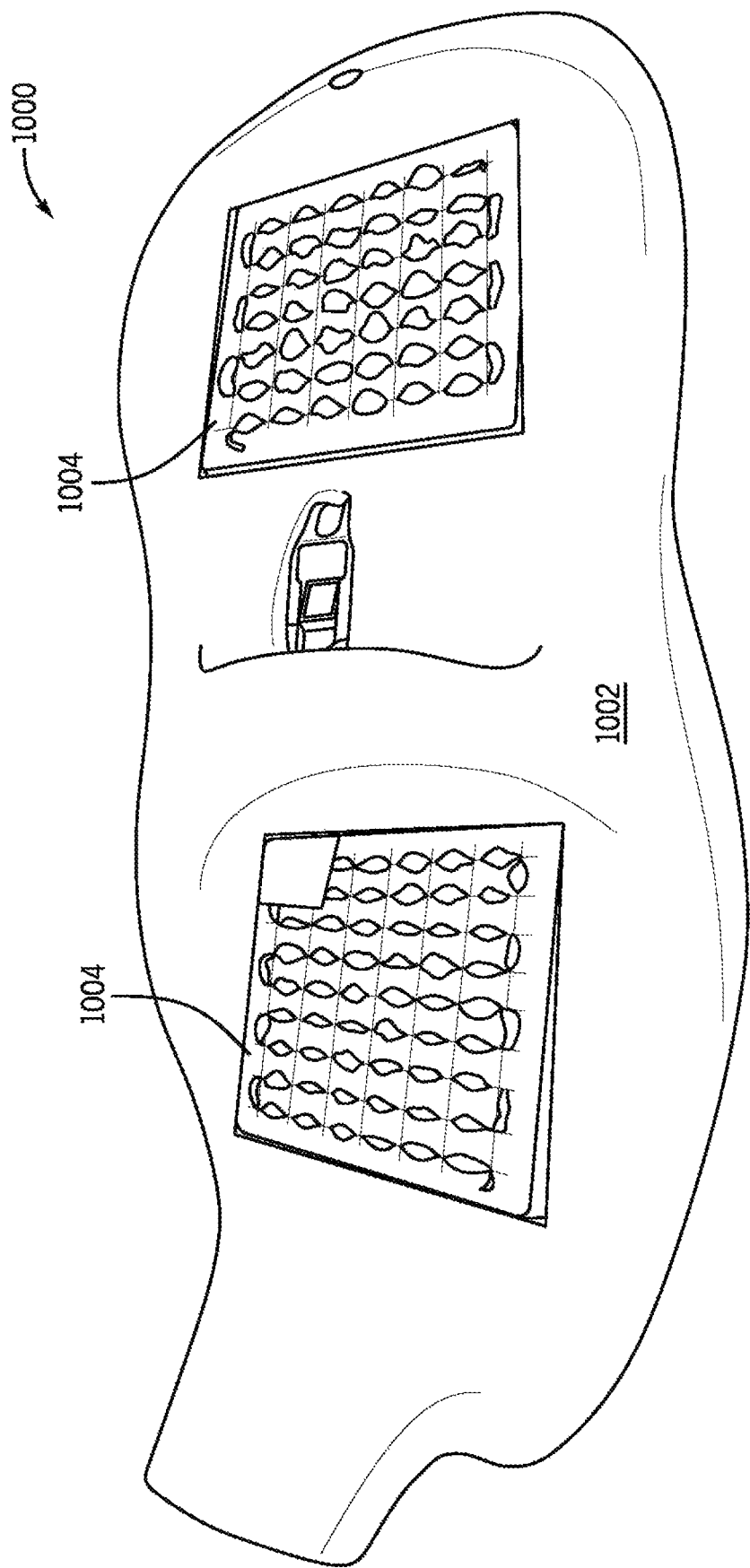
FIG. 10 illustrates one embodiment showing an overview of a saddle with two heating/cooling pads installed.

FIG. 10 illustrates, generally at 1000, one embodiment showing an overview of a saddle 1002 with two heating/cooling pads installed 1004. Note that the electrical wiring passes through the seat to be wired on the bottom (not denoted). In one embodiment the saddle 1002 has flexibility to conform to a rider's shape when the rider is seated on the saddle.

Figure 11:
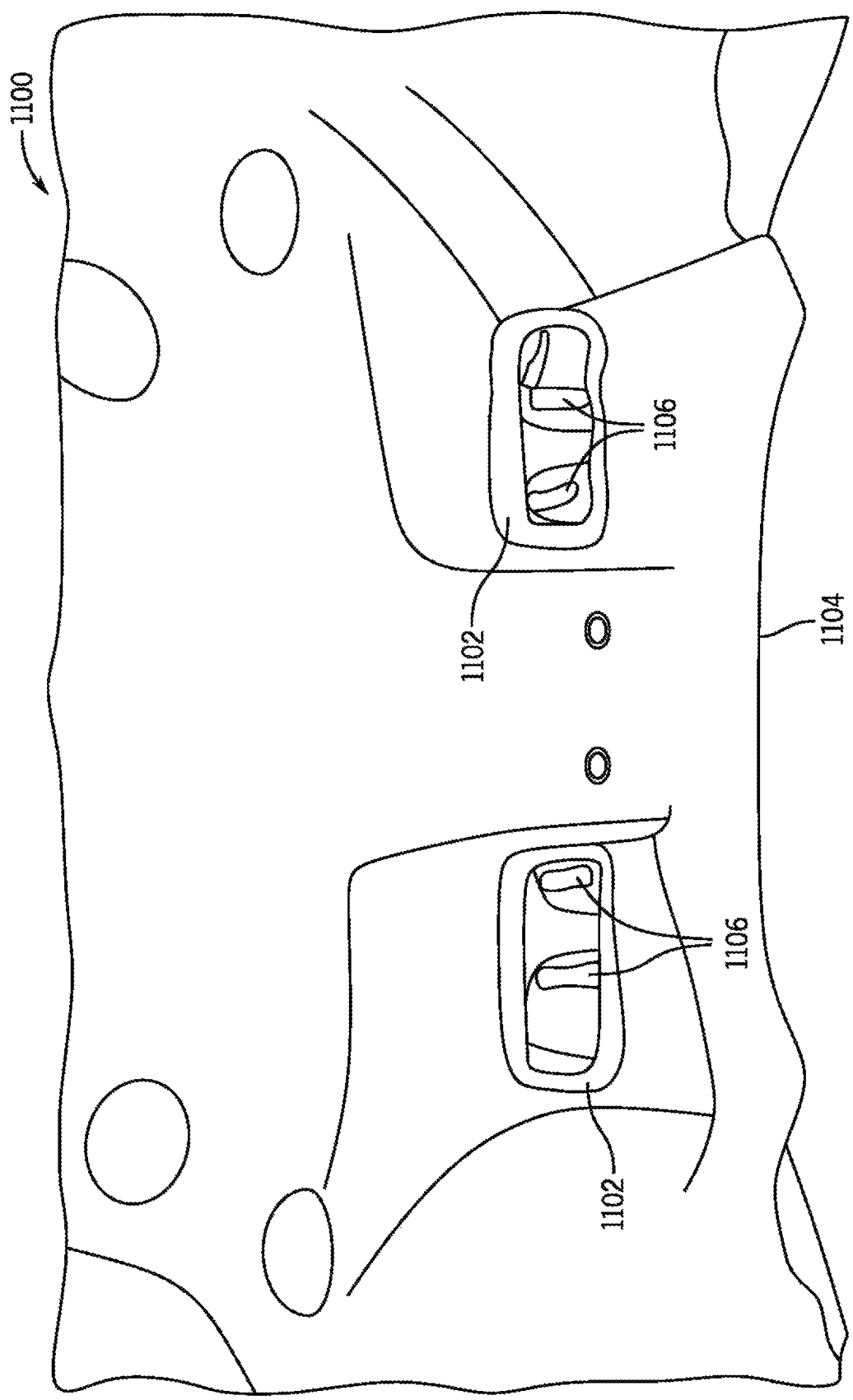
FIG. 11 illustrates one embodiment showing a view of air exhaust ports at the front of the seat (also called a saddle).

FIG. 11 illustrates, generally at 1100, one embodiment showing a view of air exhaust ports 1102 at the front of the seat 1104. You can see where cooling air passes through the channels 1106 of the combo heating and cooling pad.

Figure 12:
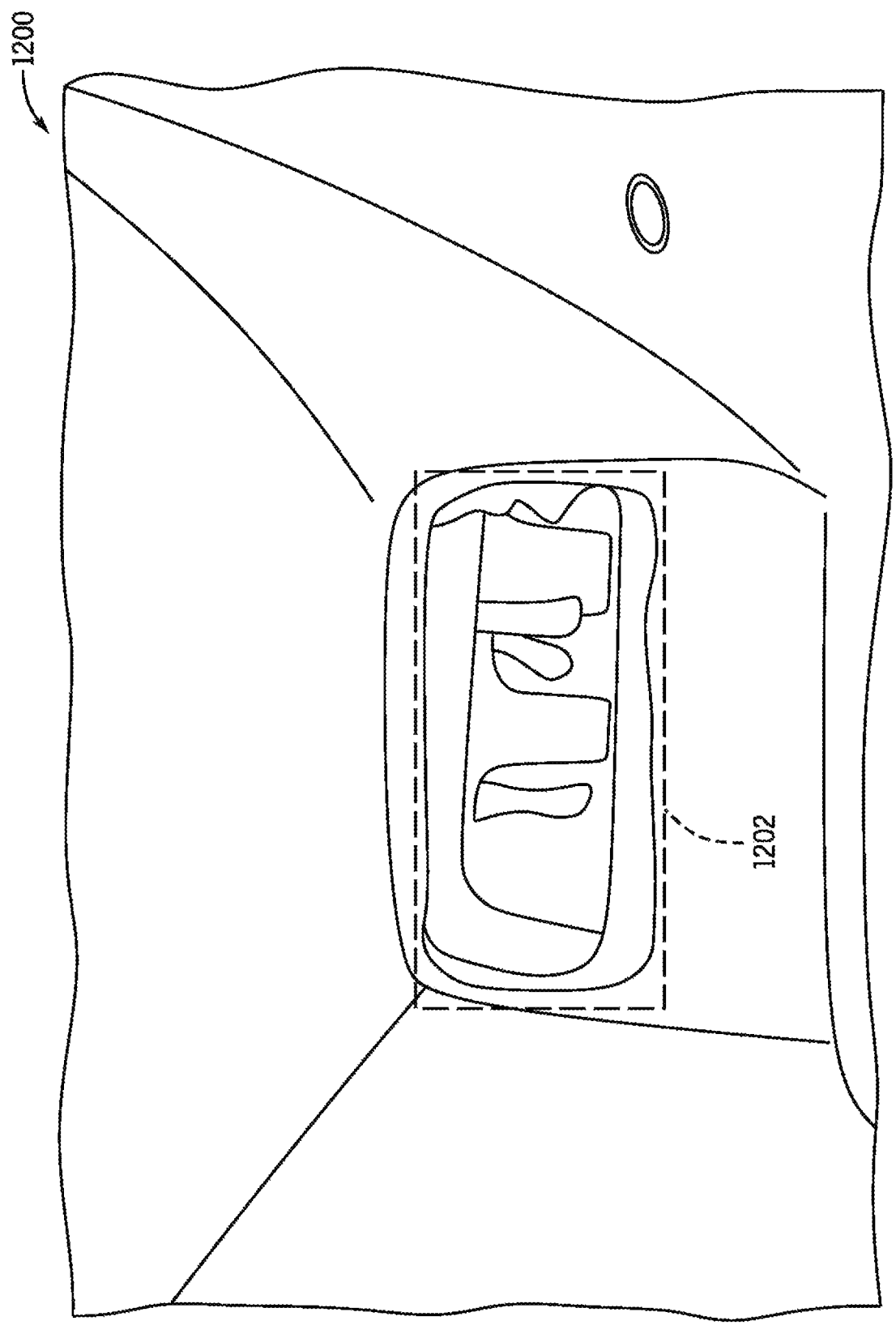
FIG. 12 illustrates one embodiment showing a closer view of an air exhaust port.

FIG. 12 illustrates, generally at 1200, one embodiment showing a closer view of an air exhaust port 1202 (dashed lines).

Figure 13:
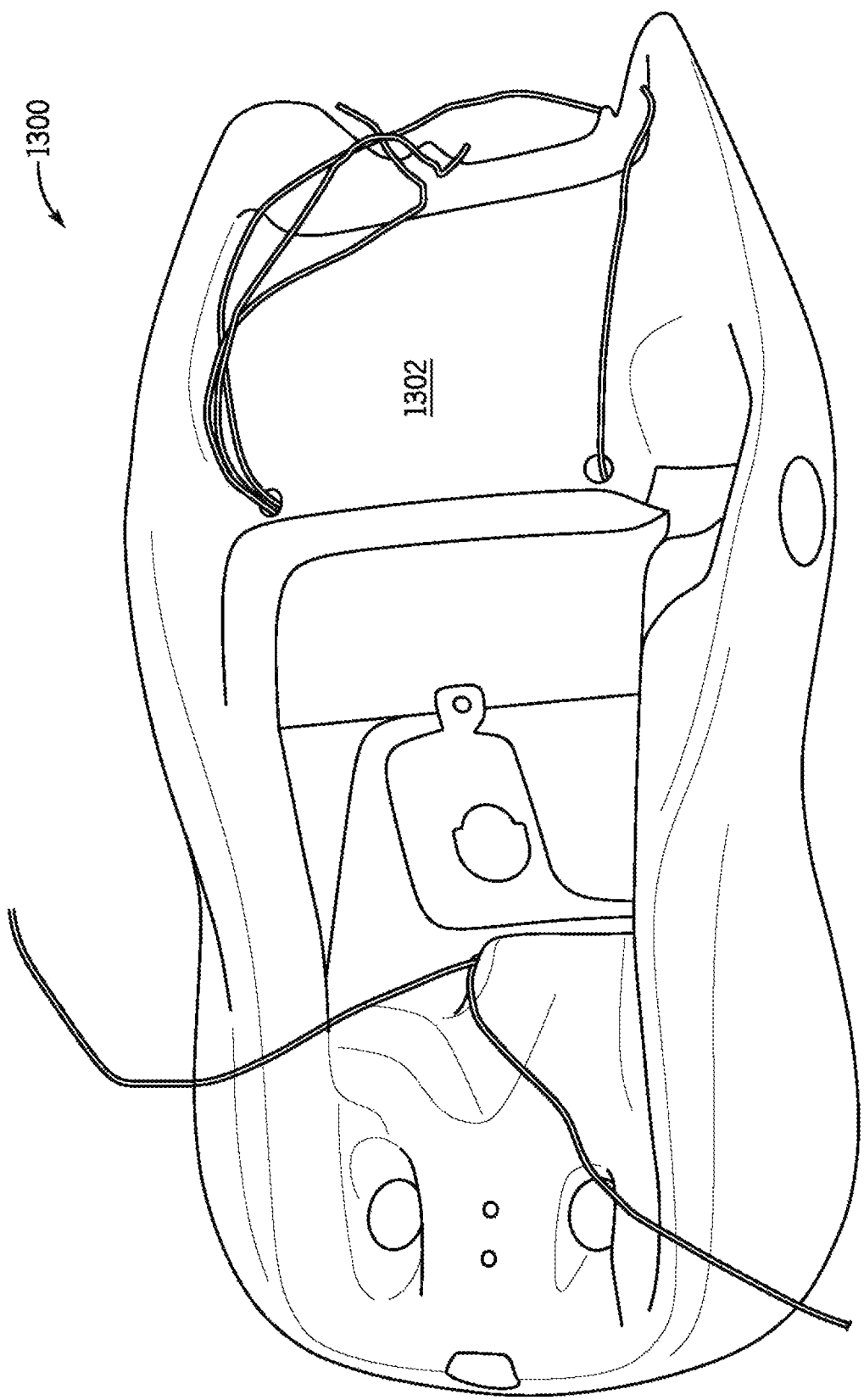
FIG. 13 illustrates one embodiment showing an underside of a seat showing electrical wires ready for connection.

FIG. 13 illustrates, generally at 1300, one embodiment showing an underside of a seat showing electrical wires ready for connection. Note how they pass to the underside of the seat. At 1302 is a rigid base.

Figure 14:
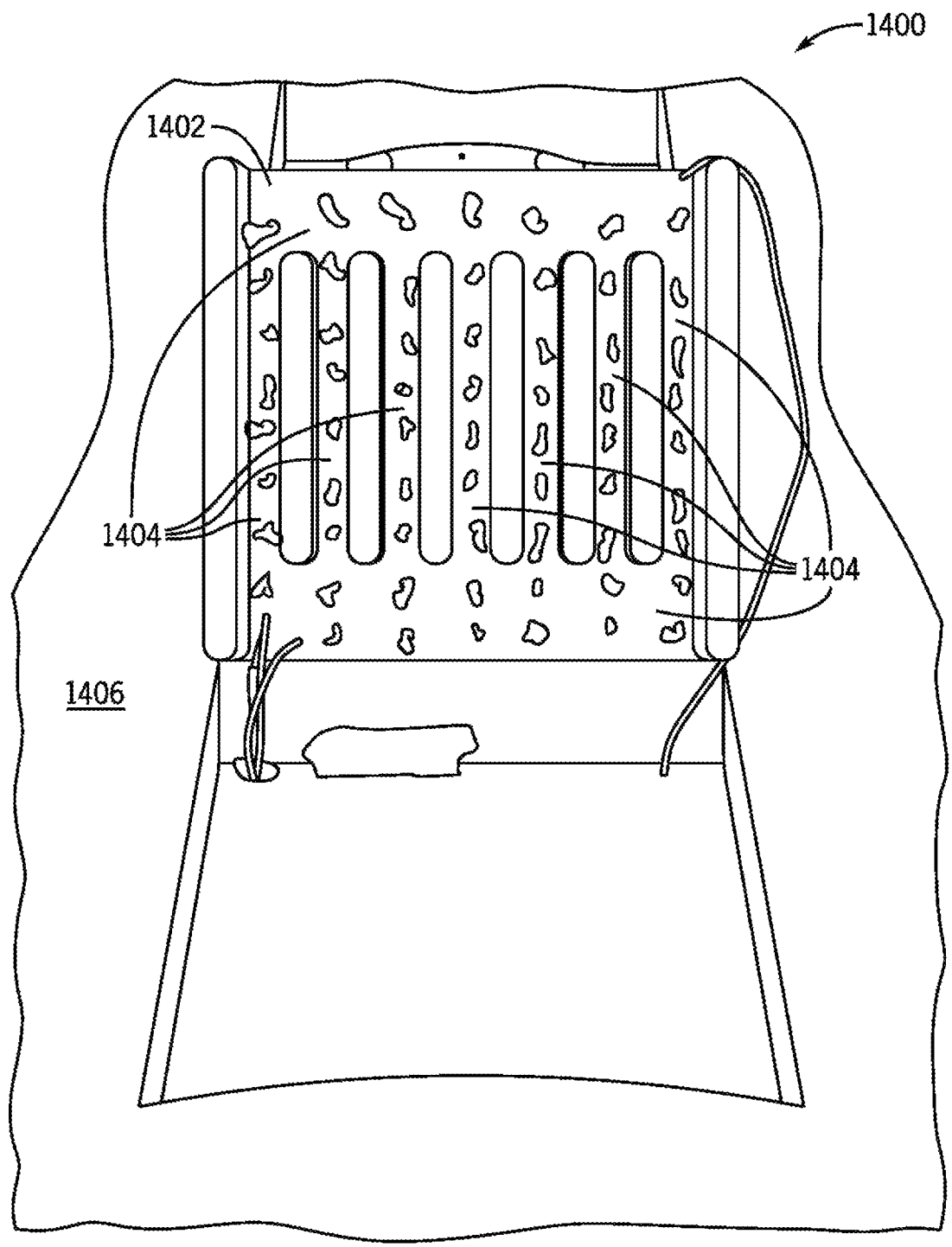
FIG. 14 illustrates one embodiment showing a view of the combination heating/cooling pad and showing one embodiment showing the orientation of the air channels.

FIG. 14 illustrates, generally at 1400, one embodiment showing a view of the combination heating/cooling pad 1402 showing the orientation of the air channels, for example as denoted at 1404. These air channels are flexible in that they can flex with the saddle 1406 flexing.

Figure 15:
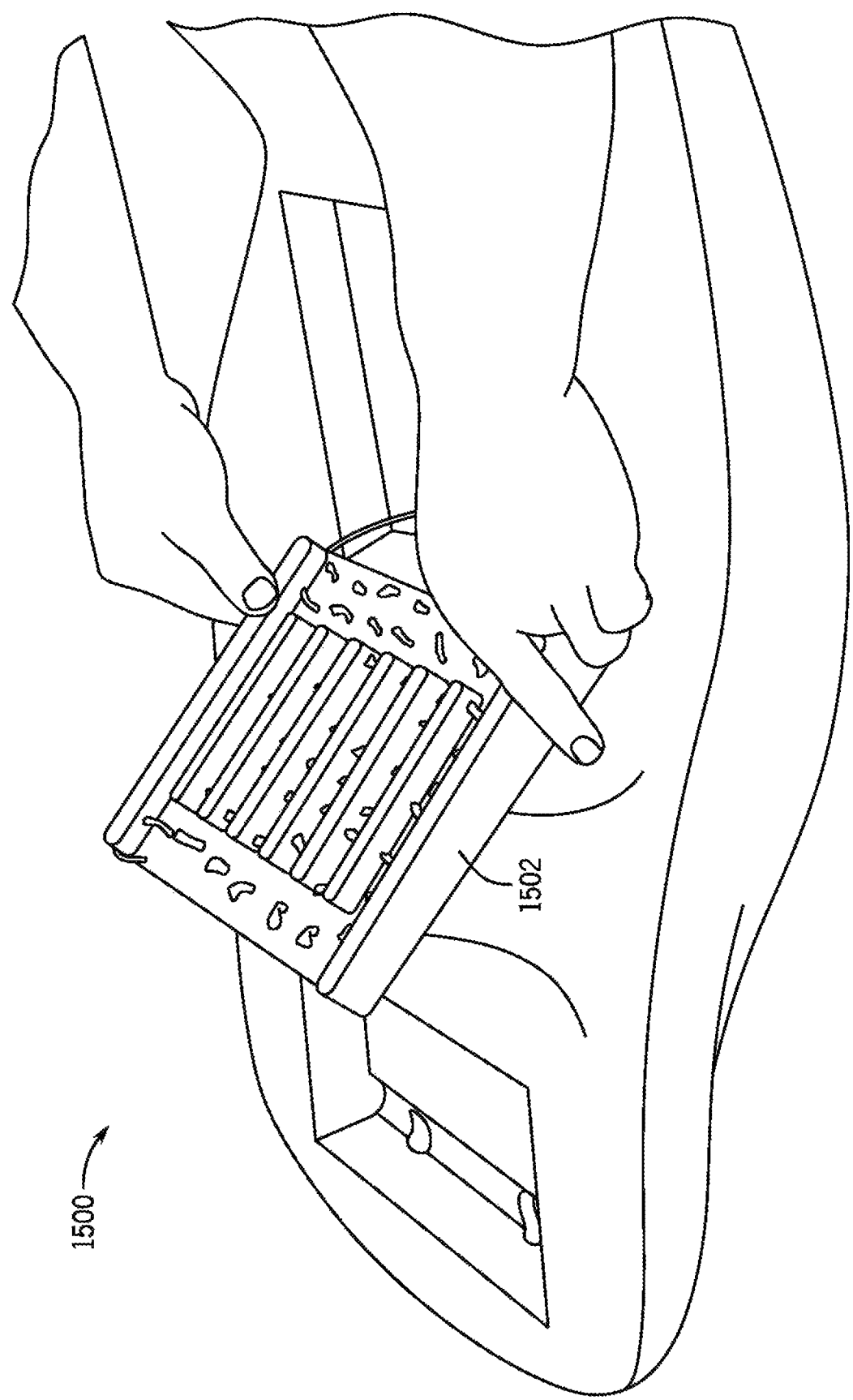
FIG. 15 illustrates one embodiment showing installing a combo pad (heating/cooling pad) also denoted heating/cooling element (HCE).

FIG. 15 illustrates, generally at 1500, one embodiment showing installing a combo pad (HCE) 1502.

Figure 16:
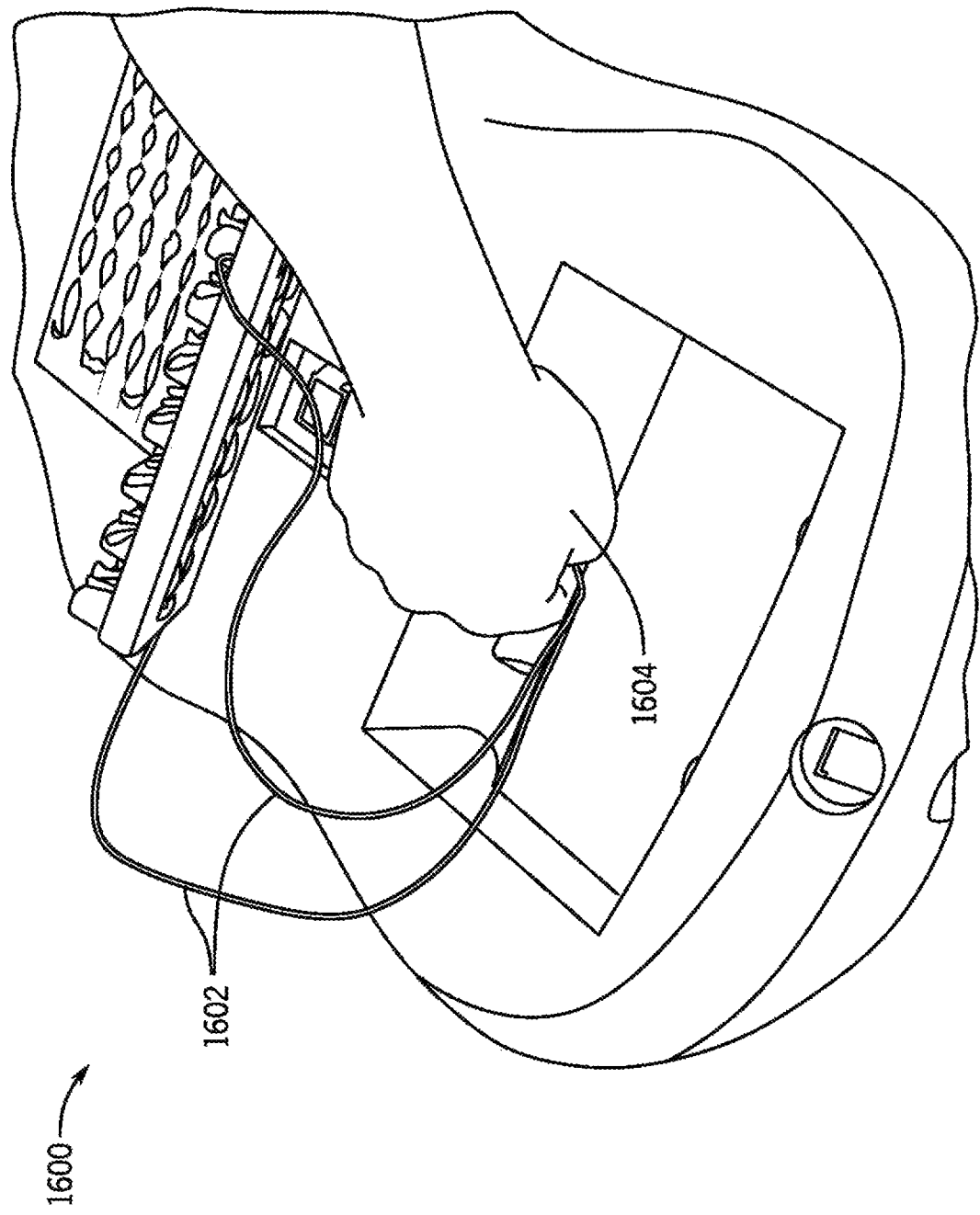
FIG. 16 illustrates one embodiment showing passing wiring through built in wire channels.

FIG. 16 illustrates, generally at 1600, one embodiment showing passing wiring 1602 through built in wire channels (not visible but below hand 1604).

Figure 17:
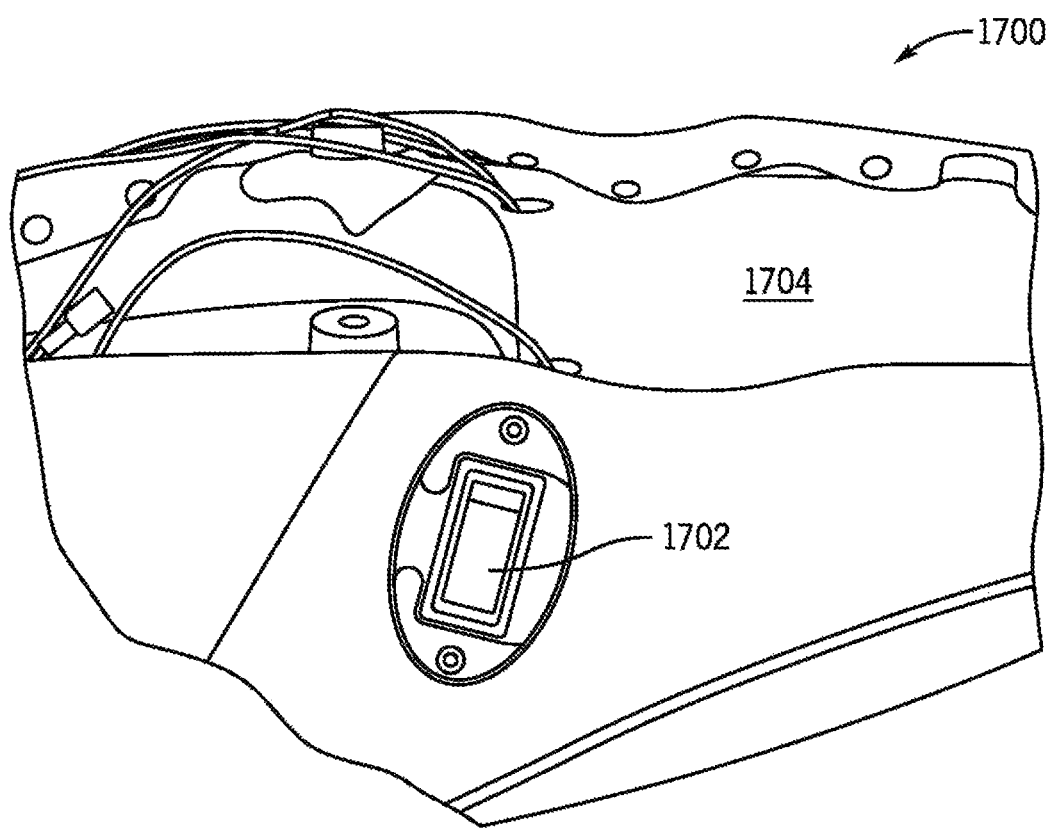
FIG. 17 illustrates one embodiment showing a control switch is located in a side of the seat.

FIG. 17 illustrates, generally at 1700, one embodiment showing a control switch is located in a side of the seat. In this embodiment the switch 1702 has three positions: Cool, Off, and Heat. At 1704 is a rigid base.

Figure 18:
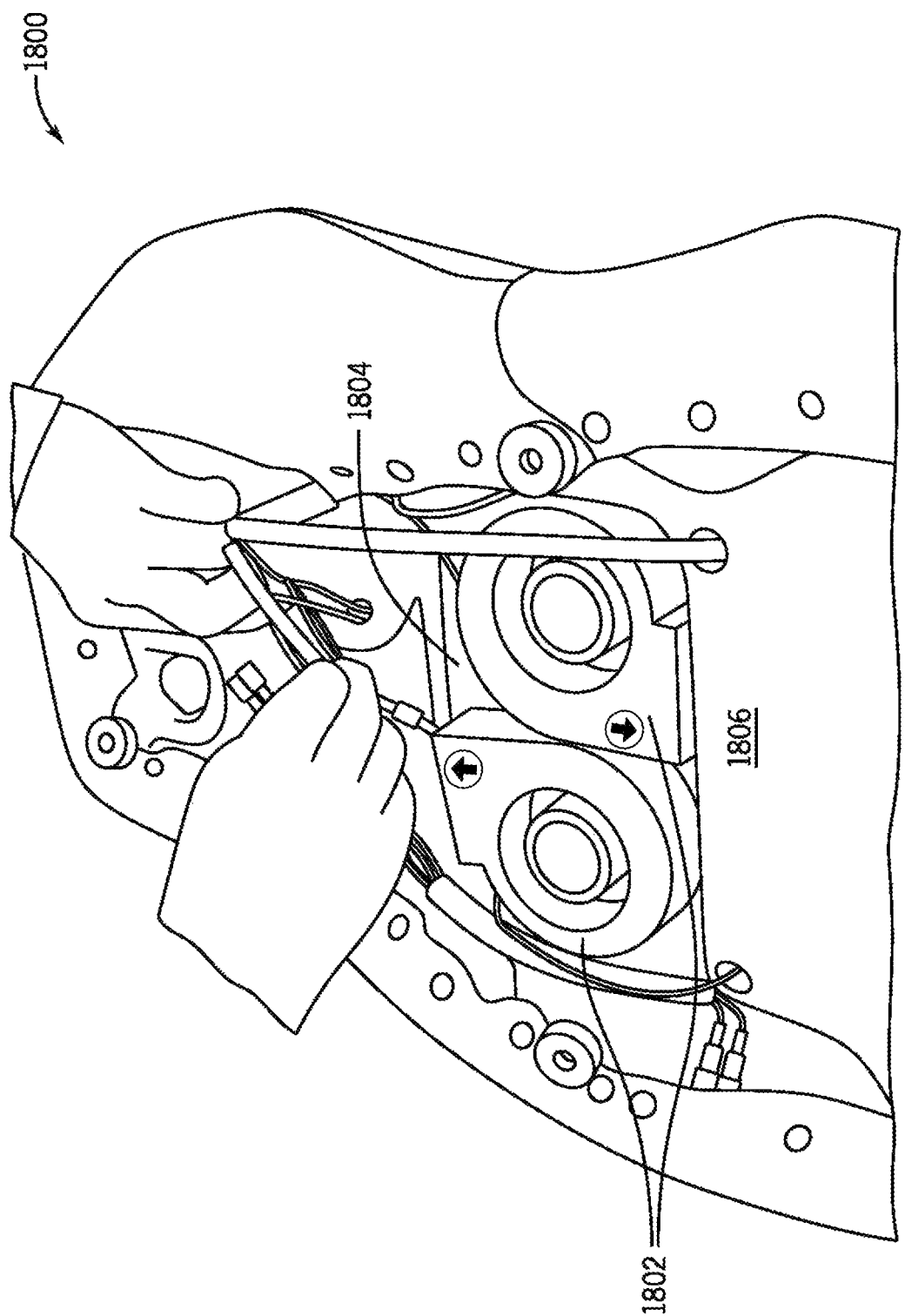
FIG. 18 illustrates one embodiment showing fans installed on the seat base to push air through the air channels built into the seat and combination pads (HCEs).

FIG. 18 illustrates, generally at 1800, one embodiment showing fans 1802 are installed on the seat base 1804 to push air through the air channels built into the seat and combination pads (HCEs). The air flow cools the conductors thereby making the surface of the pad feel cool to a rider. At 1806 is a rigid base.

Figure 19:
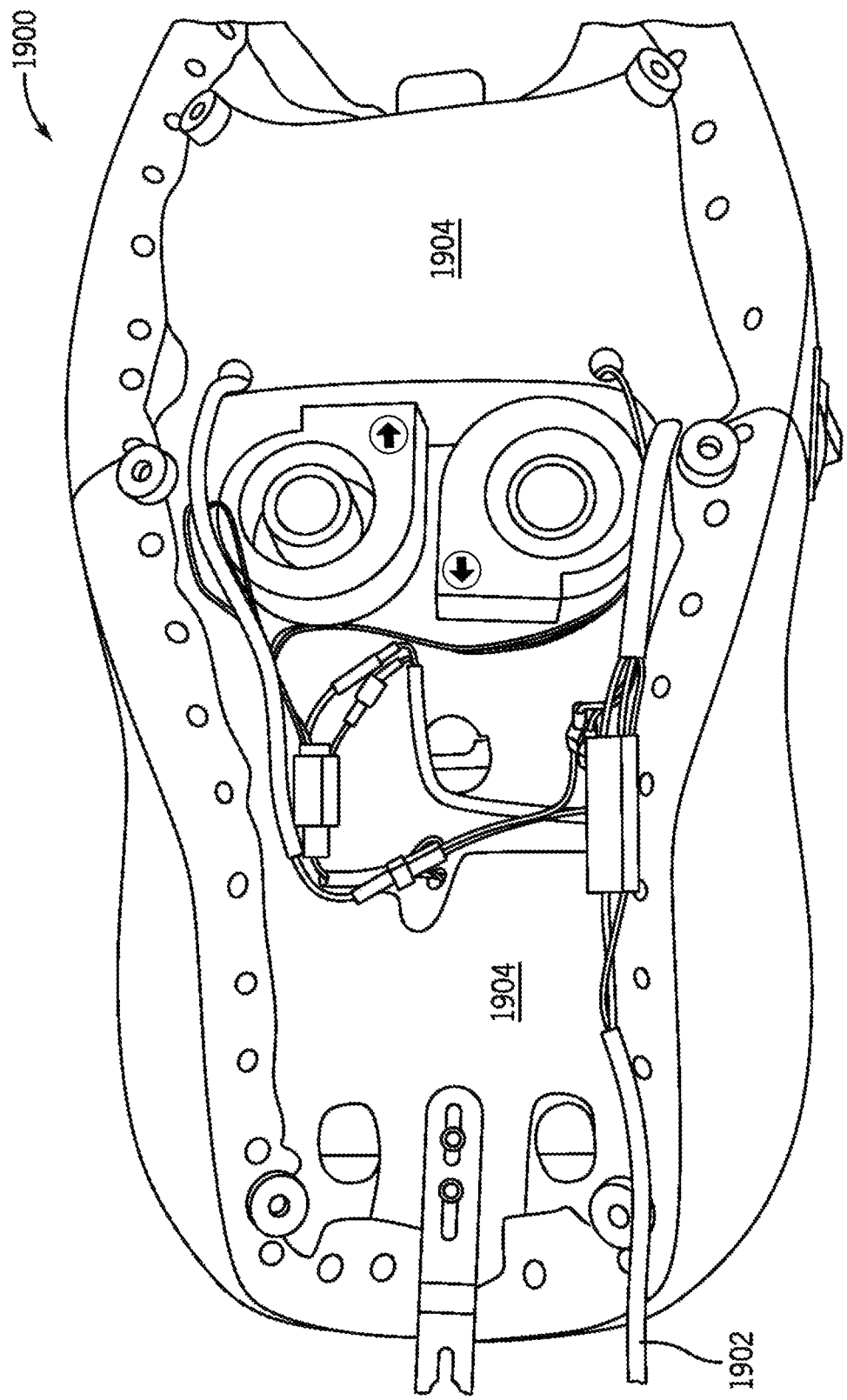
FIG. 19 illustrates one embodiment showing all components of the heating and cooling system are self-contained on or in the seat.

FIG. 19 illustrates, generally at 1900, one embodiment showing all components of the heating and cooling system are self contained on or in the seat. In this embodiment one needs to only supply 12 VDC power for the system to function. At 1902 are wires to the 12 VDC power supply. In one embodiment the 12 VDC is a battery. At 1904 is a rigid base.

Figure 20:
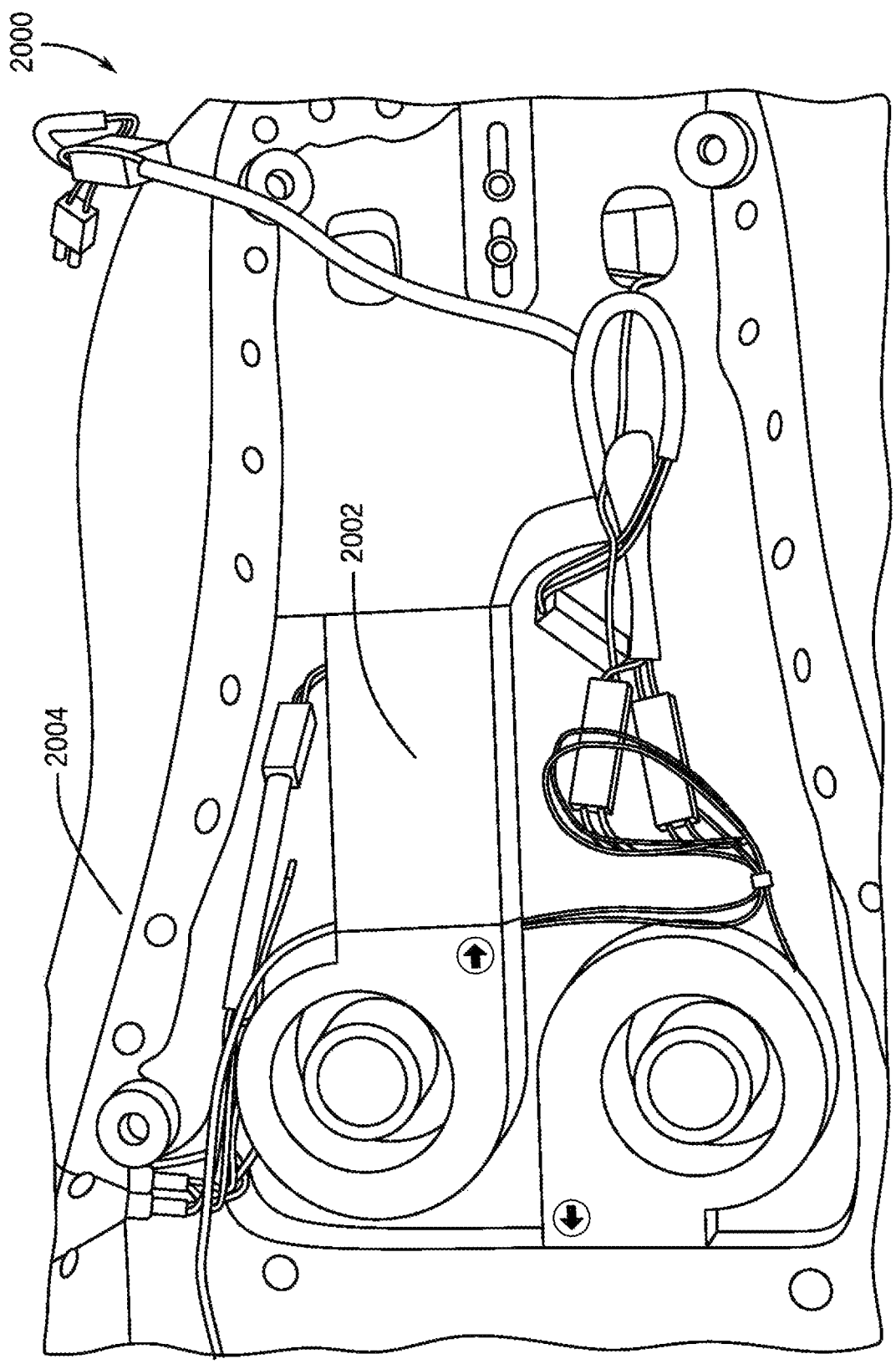
FIG. 20 illustrates one embodiment showing wiring and components in place, and ducting added.

FIG. 20 illustrates, generally at 2000, one embodiment showing that once all wiring and components are in place, ducting 2002 is added and the airways are sealed for maximum air flow through the seat 2004 (not through the seat cover material).

Figure 21:
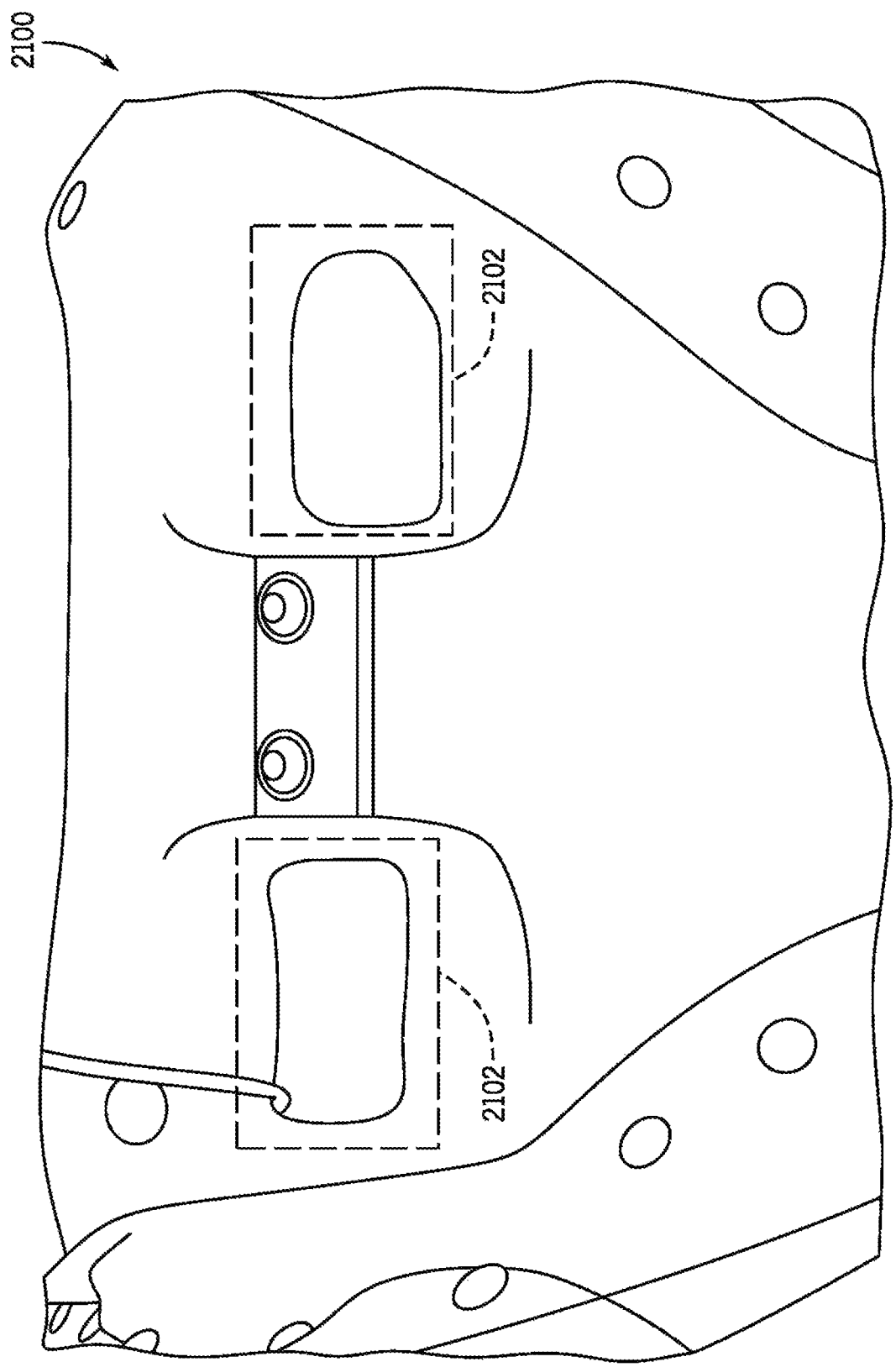
FIG. 21 illustrates one embodiment showing a view of air exhaust ports at the front of the seat.

FIG. 21 illustrates, generally at 2100, one embodiment showing a finished view of the air exhaust ports 2102 (dashed white rectangles) at the front of the seat.

Figure 22:
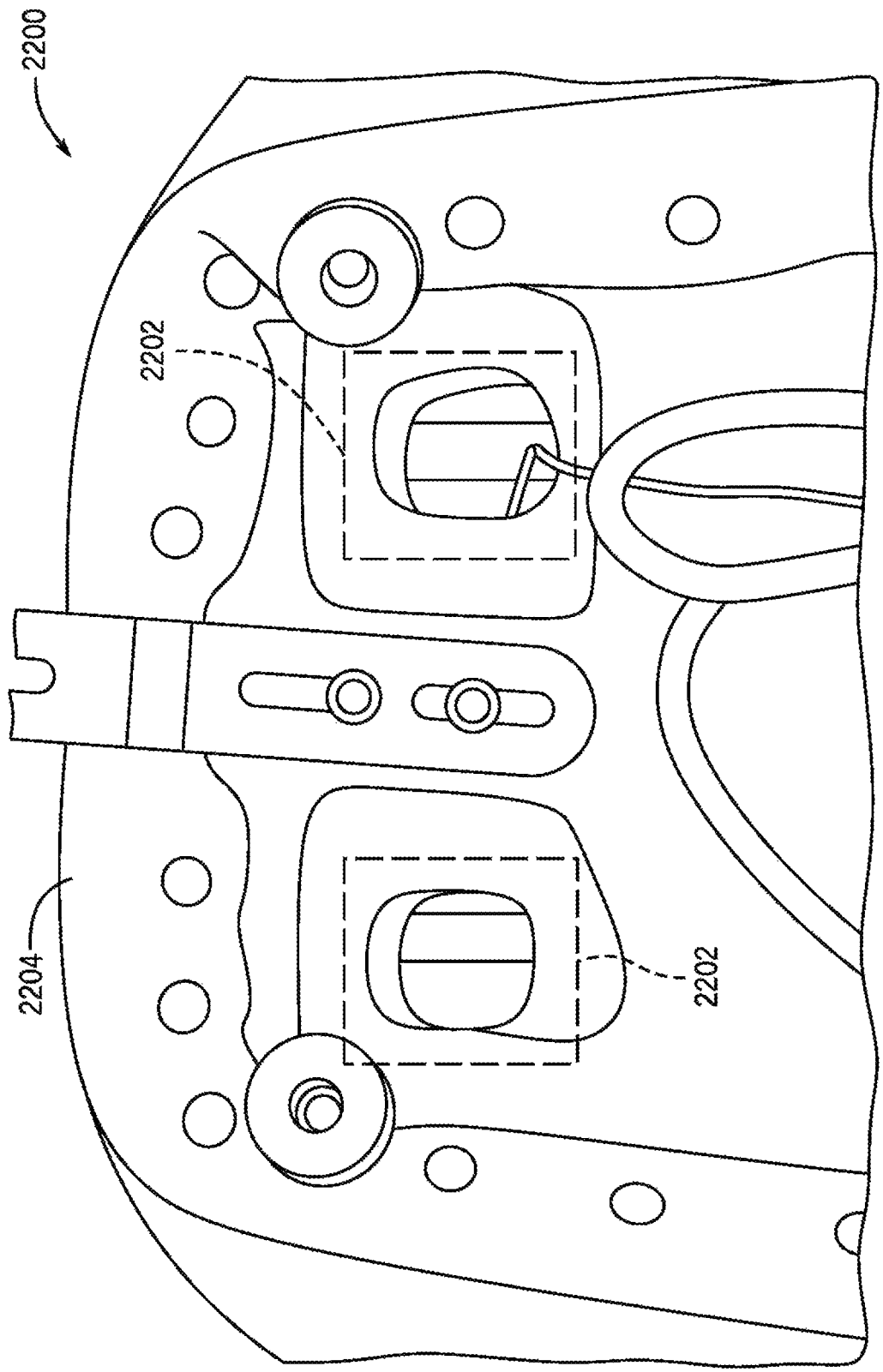
FIG. 22 illustrates one embodiment showing a view of air exhaust ports at the rear of the seat.

FIG. 22 illustrates, generally at 2200, one embodiment showing a finished view of the air exhaust ports 2202 (white dashed rectangles) at the rear of the seat 2204.

Figure 23:
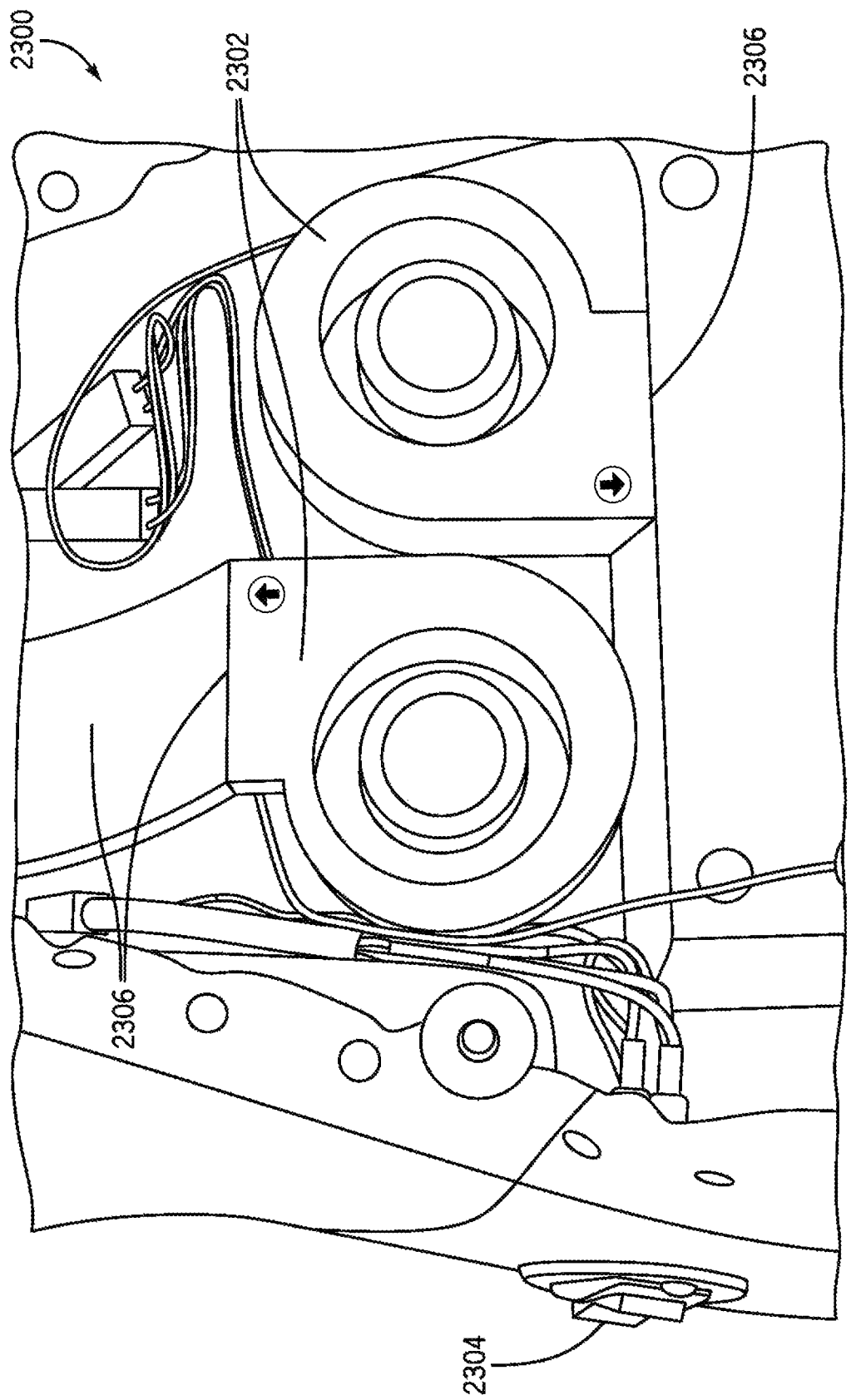
FIG. 23 illustrates one embodiment showing cooling fans installed and wired to a switch.

FIG. 23 illustrates, generally at 2300, one embodiment showing cooling fans installed 2302, wired to a switch 2304, ducted and sealed (for example at 2306).

Figure 24:
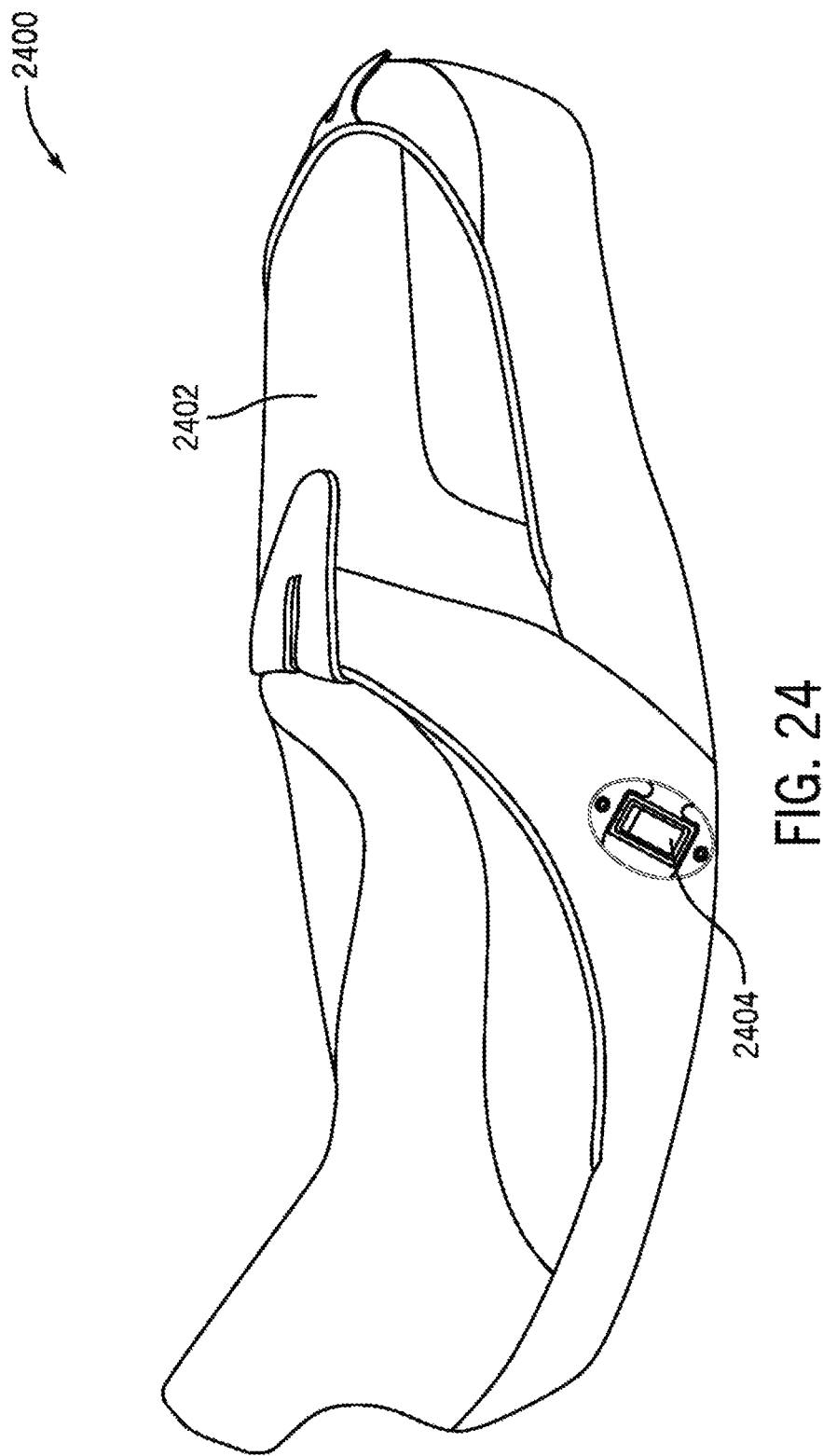
FIG. 24 illustrates one embodiment showing a completed seat which a rider(s) sits on and the HCE's conform to the rider(s).

FIG. 24 illustrates, generally at 2400, one embodiment showing a completed seat 2402. 100% self-contained, just add power. At 2404 is a control switch.

Figure 25:
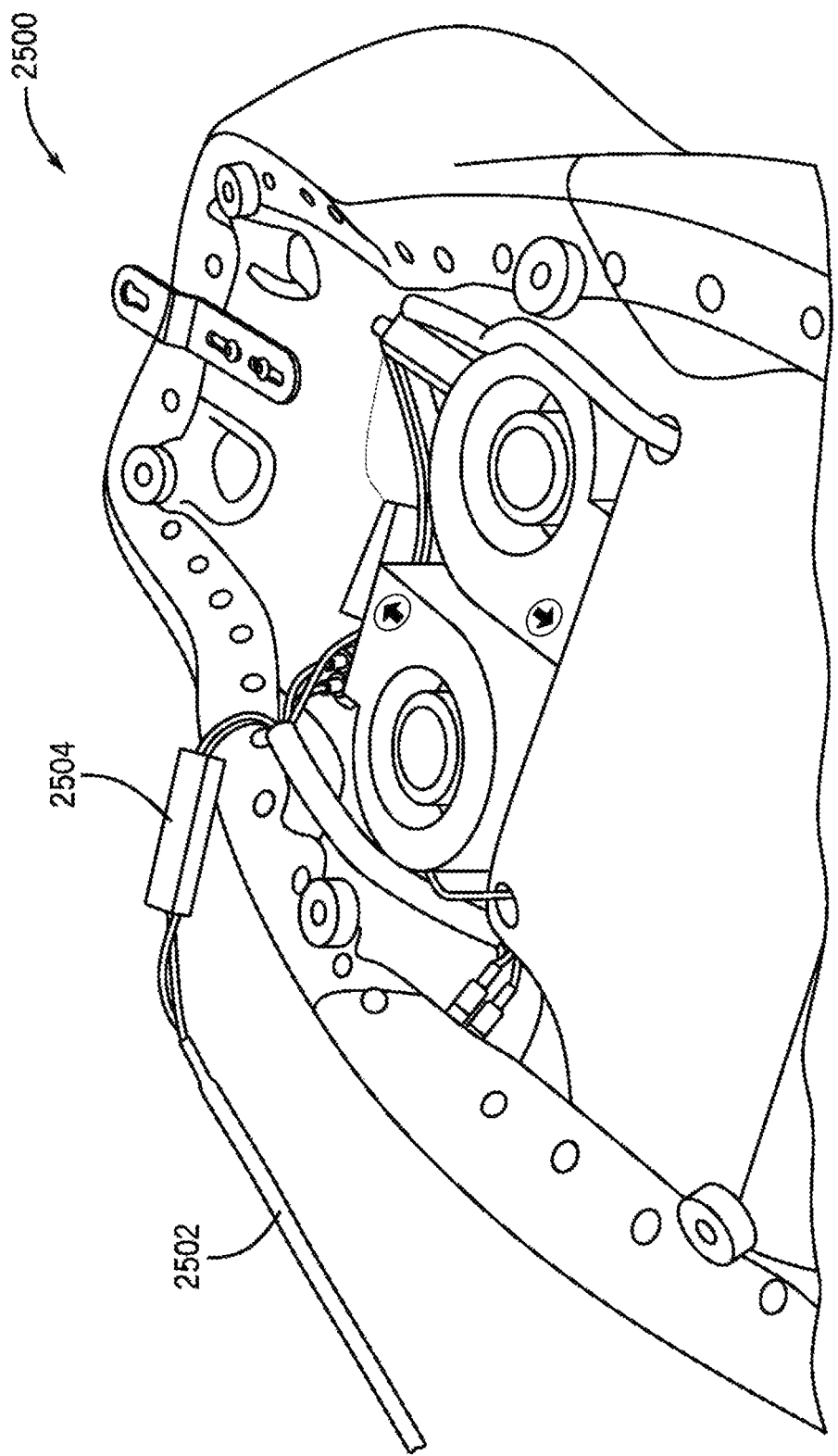
FIG. 25 illustrates one embodiment showing a seat having a weather proof quick connector.

FIG. 25 illustrates, generally at 2500, one embodiment showing a bench top 12 VDC power supply (not visible) connected via cable 2502 for quality control testing. Note the weatherproof quick connector 2504 used.

Figure 26:
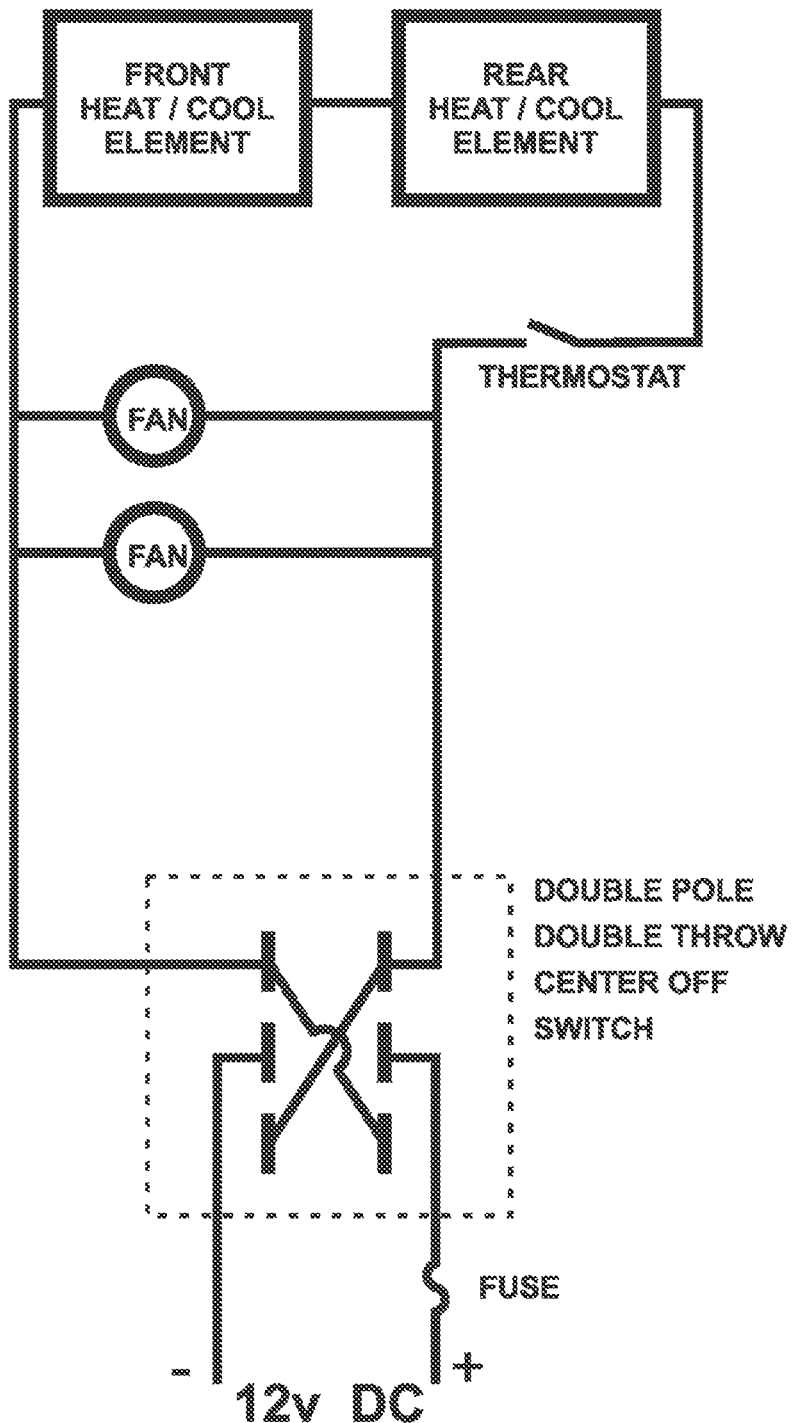
FIG. 26 illustrates one embodiment showing a schematic diagram. Here 2 HCEs are in series controlled by a thermostat.

FIG. 26 illustrates, generally at 2600, one embodiment showing a schematic diagram. Here 2 HCEs are in series controlled by a thermostat. 2 fans are in parallel. The DPDT (Double Pole Double Throw) Center Off switch controls the direction of current flow into the HCEs.

Figure 27:
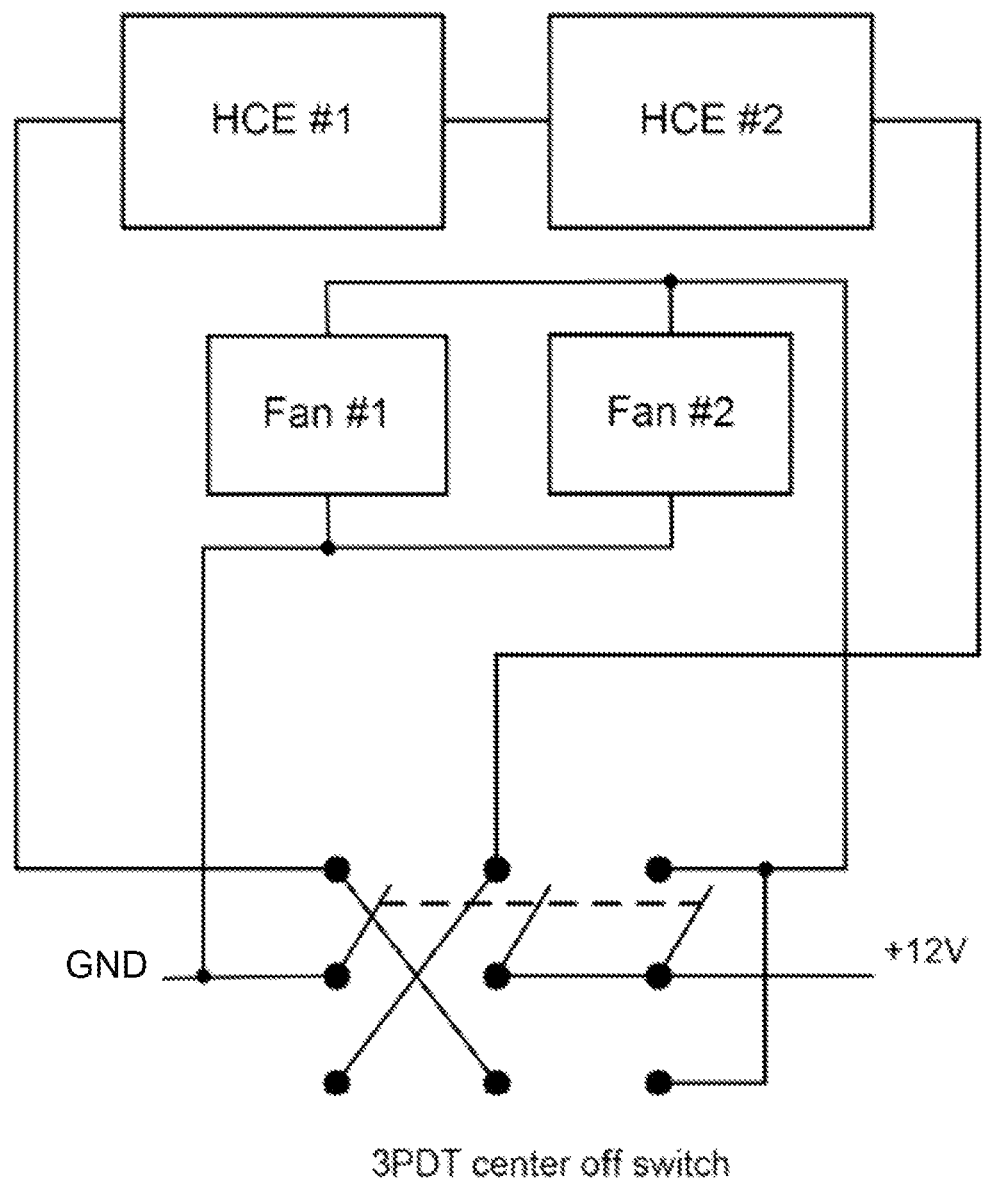
FIG. 27 illustrates one embodiment showing a schematic diagram where HCEs are in series.

FIG. 27 illustrates, generally at 2700, one embodiment showing a schematic diagram. Here 2 HCEs are in series. The 2 fans are in parallel and the fans can be DC fans as +12V and ground (GND— the negative terminal of the 12V supply also called −12V) are supplied to them. A 3PDT Center Off switch is used to control the voltage polarity to the HCEs and power to the fans.

In one embodiment a diode bridge may be attached to the reversing voltage to provide a DC voltage to DC fans.

Figure 28:
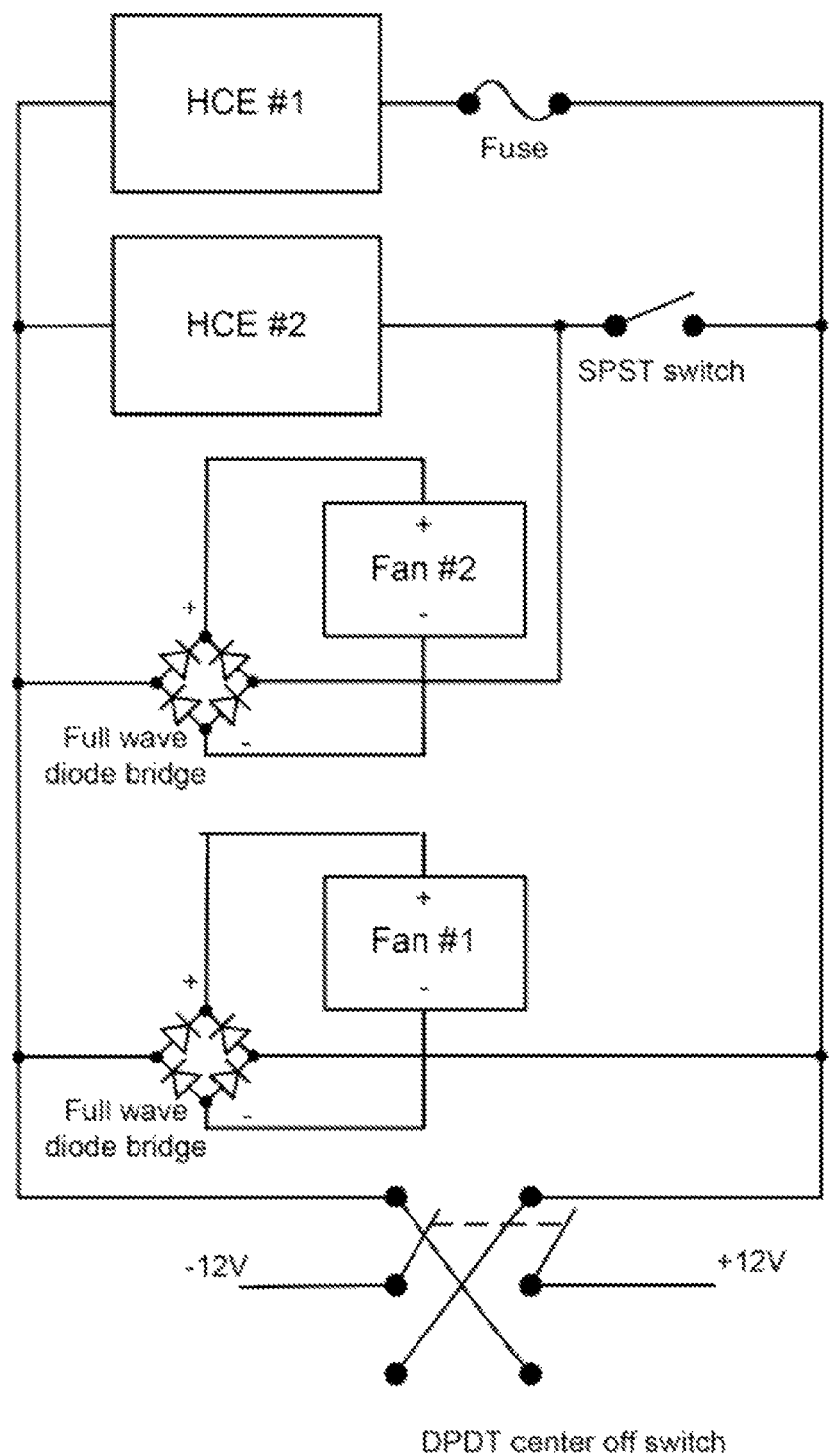
FIG. 28 illustrates one embodiment showing a schematic for a 2 HCE system with a separate control for one of the HCE's.

FIG. 28 illustrates, generally at 2800, one embodiment showing a schematic for a 2 HCE system. In this embodiment HCE #1 and HCE #2 are operated in parallel when the SPST switch is closed. This embodiment allows the HCE #2 and the DC Fan #2 combination to be selectively turned on/off when HCE #1 and Fan #1 are powered on. In this way, for example, if HCE #1 is for the front of a seat and HCE #2 is for a back of a seat, a user may decide HCE #2 is not needed and can turn it and Fan #2 off. In this embodiment is shown a Fuse in line with HCE #1. Also shown are full wave diode bridges so that DC fans can be utilized.

Figure 29:
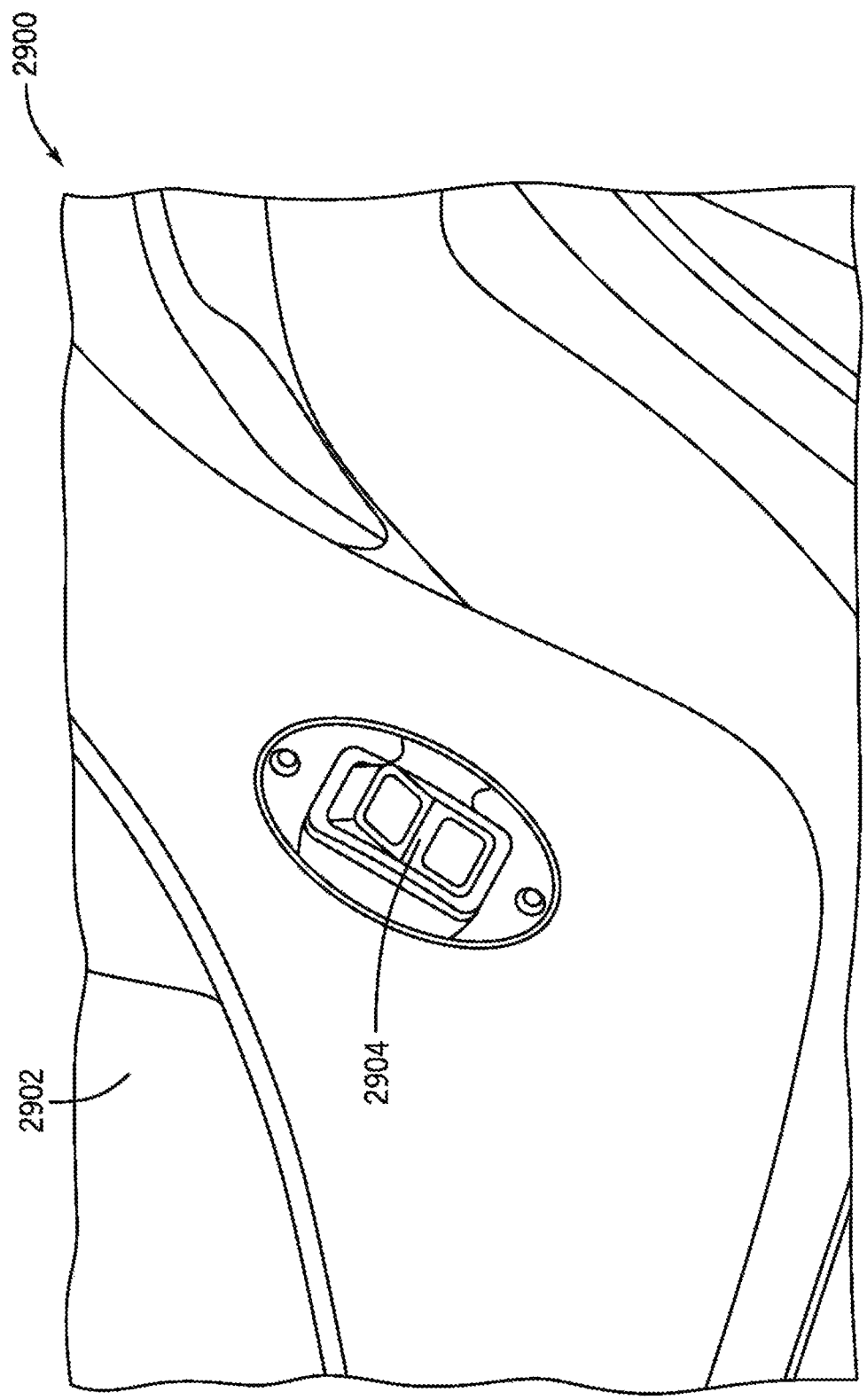
FIG. 29 illustrates one embodiment showing a closeup of a 3 position control switch.

FIG. 29 illustrates, generally at 2900, one embodiment showing a closeup of a completed seat 2902 showing at 2904 a 3 position control switch.

Figure 30:
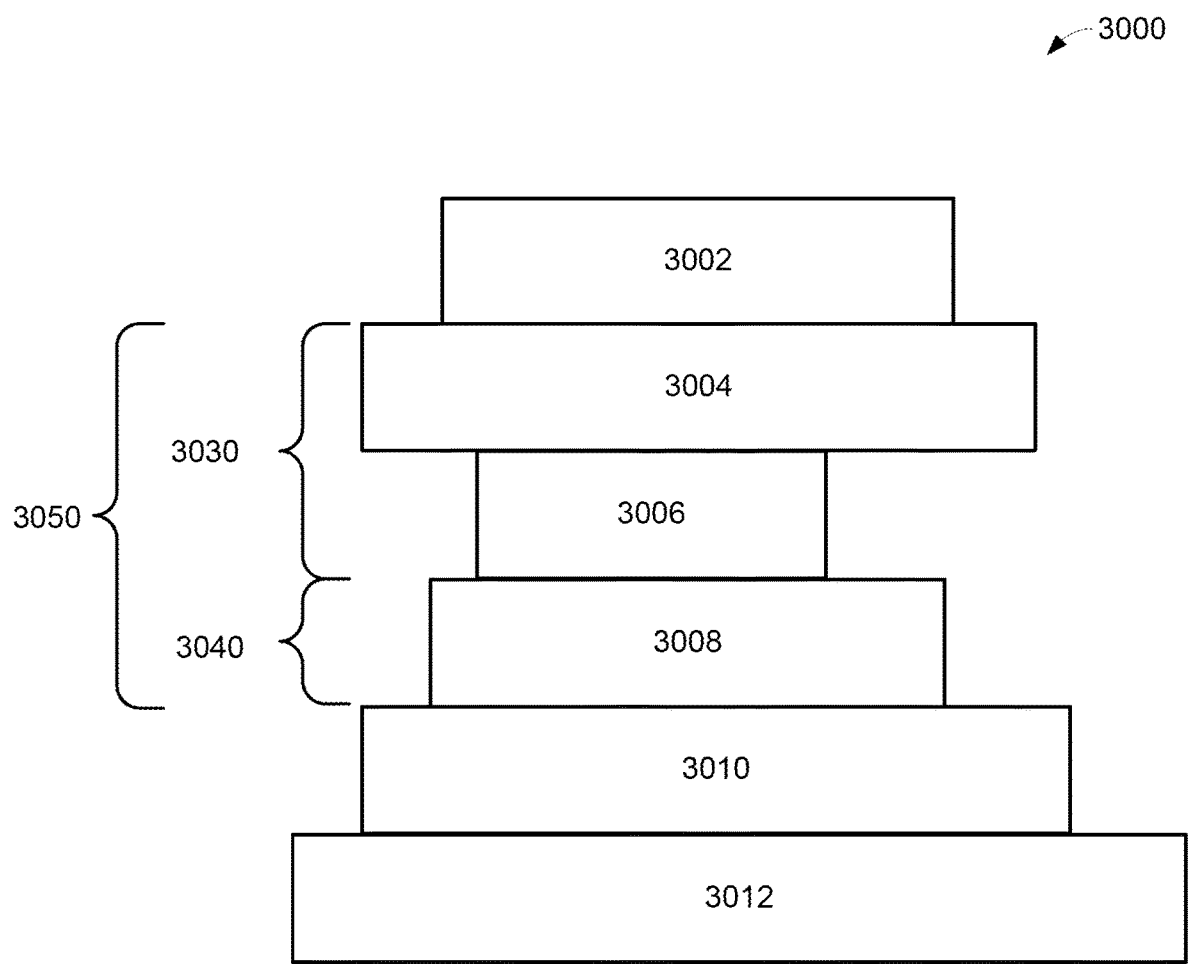
FIG. 30 illustrates one embodiment showing a physical and thermal stack up.

FIG. 30 illustrates, generally at 3000, one embodiment showing a physical and thermal stack up. At 3002 is a flexible thermal target. The flexible thermal target in one embodiment is a rider of the motorcycle. At 3004 is a flexible thermal target barrier. In one embodiment the flexible thermal target barrier is a non-porous outer covering of a motorcycle seat. At 3006 is a flexible thermal engine. The flexible thermal engine can consist of one or more flexible thermal engines. The flexible thermal engine can have one or more flexible thermal channels. In one embodiment flexible thermal channels are flexible air channels. In one embodiment the flexible thermal channels contain a liquid or liquid/gas combination. At 3008 is a rigid thermal transfer engine. Rigid meaning substantially firmer and inflexible compared to the flexible members in the embodiment (e.g. 3004, 3006). At 3010 is a rigid base. At 3012 is a rigid vehicle, for example the frame of a motorcycle. At 3030 is a stack up of 3004 and 3006. At 3040 is a stack up of 3008. At 3050 is a stack up of 3030 and 3040. In one embodiment 3050 is a thermal transfer unit. In one embodiment the interface between 3030 and 3040 has flexible mechanical and electrical connections. $\theta_c$ denotes thermal resistance (impedance) to convective heat transfer, $\theta_k$ denotes thermal resistance (impedance) to conductive heat transfer, and $\theta_r$ denotes thermal resistance (impedance) to radiative heat transfer. In one embodiment for stack up 3040 $\theta_c < \theta_r$. In one embodiment for stack up 3040 $\theta_c < \theta_r$ and $\theta_c < \theta_k$. In one embodiment for stack up 3040 $\theta_c < \theta_r$ and $\theta_c < \theta_k$. In one embodiment for stack up 3030 $\theta_k < \theta_r$ and $\theta_k < \theta_c$. In one embodiment for stack up 3030 $\theta_k < \theta_r < \theta_c$. In one embodiment 3008 can be an air transformer, such as but not limited to one or more, fans, peristaltic pump, ambient airflow, etc. or a combination of these and others. In one embodiment the flexible thermal engine has two sides and can present a cooler side to either 3004 or 3008.

Figure 31:
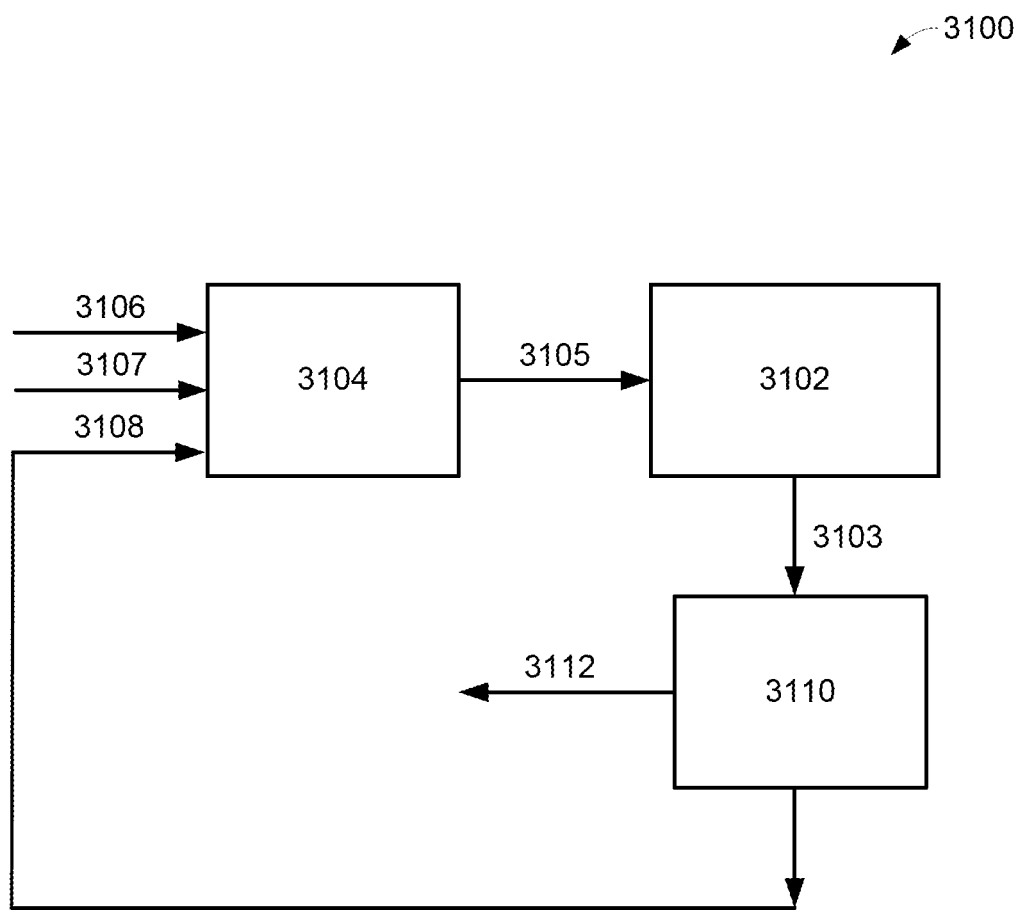
FIG. 31 illustrates one embodiment showing a control system.

FIG. 31 illustrates, generally at 3100, one embodiment showing a control system. At 3102 is a thermal transfer unit. The thermal transfer unit may be in thermal communication with a rider of a motorcycle. At 3104 is thermal transfer control unit having an output 3105 controlling the thermal transfer unit. The 3104 thermal transfer control unit receives inputs from 3106, for example, a user or a local input. The 3104 thermal transfer control unit can also receive inputs from 3107, for example, a remote input. The 3104 thermal transfer control unit also receives inputs from 3108 which comes from sensing unit 3110. Thermal transfer unit 3102 provides inputs 3103 to sensing unit 3110. Sensing unit 3110 also provide outputs 3112. Outputs 3112 can be for remote detection, can be an interface to a wireless unit, or a cell phone interface.

Thus Method and Apparatus for Heating and Cooling a Motorcycle Seat has been described.

Because of the thermal embodiments the present invention requires specialized hardware, for example, but not limited to, separate flexible channels for thermal conductivity.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as may be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for Heating and Cooling a Motorcycle Seat have been described.

What is claimed is:

1. A method for heating or cooling a motorcycle seat comprising:
   locating a deformable cooling element inside the motorcycle seat wherein the deformable cooling element can deform to substantially conform with a rider's body shape sitting on the motorcycle seat;
   locating a deformable heating element inside the motorcycle seat wherein the deformable heating element can deform to substantially conform with the rider's body shape sitting on the motorcycle seat;
   locating a temperature sensing unit proximate to the motorcycle seat; and
   using the temperature sensing unit and user input to control the deformable cooling element and the deformable heating element.

* * * * *